(12) United States Patent
Zhou et al.

(10) Patent No.: US 12,496,337 B2
(45) Date of Patent: Dec. 16, 2025

(54) ONCOLYTIC VIRUS VACCINE AND DRUG FOR TREATING TUMORS BY COMBINING ONCOLYTIC VIRUS VACCINE WITH IMMUNE CELLS

(71) Applicant: JOINT BIOSCIENCES (SH) LTD., Shanghai (CN)

(72) Inventors: Guoqing Zhou, Shanghai (CN); He Yang, Shanghai (CN); Fan Zhang, Shanghai (CN); Suhong Zhang, Shanghai (CN)

(73) Assignee: JOINT BIOSCIENCES (SH) LTD., Shanghai (CN)

( * ) Notice: Subject to any disclaimer, the term of this patent is extended or adjusted under 35 U.S.C. 154(b) by 572 days.

(21) Appl. No.: 18/054,597

(22) Filed: Nov. 11, 2022

(65) Prior Publication Data
US 2023/0256079 A1    Aug. 17, 2023

Related U.S. Application Data

(63) Continuation of application No. PCT/CN2021/093142, filed on May 11, 2021.

(30) Foreign Application Priority Data

May 12, 2020    (CN) .......................... 202010394768.7

(51) Int. Cl.
| | | |
|---|---|---|
| A61K 39/145 | (2006.01) | |
| A61K 40/42 | (2025.01) | |
| A61K 45/06 | (2006.01) | |
| A61P 37/04 | (2006.01) | |
| A61K 39/00 | (2006.01) | |

(52) U.S. Cl.
CPC .......... *A61K 39/145* (2013.01); *A61K 40/428* (2025.01); *A61K 45/06* (2013.01); *A61P 37/04* (2018.01); *A61K 2039/5254* (2013.01)

(58) Field of Classification Search
CPC .................................................. A61K 39/145
USPC ....................................................... 424/209.1
See application file for complete search history.

(56) References Cited

U.S. PATENT DOCUMENTS

2019/0022203 A1    1/2019    Lichty et al.

FOREIGN PATENT DOCUMENTS

| CN | 104271594 A | 1/2015 |
|---|---|---|
| CN | 105087645 A | 11/2015 |
| CN | 105555958 A | 5/2016 |
| CN | 110305198 A | 10/2019 |
| CN | 110305850 A | 10/2019 |
| CN | 111286493 A | 6/2020 |
| EP | 4141111 A4 | 12/2023 |
| JP | 2007215547 A | 8/2007 |
| WO | 2014194433 A1 | 12/2014 |
| WO | WO 2019/184459 A1 * | 10/2019 |

OTHER PUBLICATIONS

First Examination Report received in corresponding Australian patent application No. 2021271961, dated Jun. 12, 2024, 4 pages.
Felt, S.A., et al., "Recent advances in vesicular stomatitis virus-based oncolytic virotherapy: a 5-year update", Journal of General Virology, 2017, 98: 2895-2911.
Kim, et al., "Creation of Matrix Protein Gene Variants of Two Serotypes of Vesicular Stomatitis Virus as Prime-Boost Vaccine Vectors", Journal of Virology, Jun. 2015, vol. 89, No. 12, pp. 6338-6351, 15 pages.
Peter A. Justice, et al., "Membrane Vesiculation Function and Exocytosis of Wild-Type and Mutant Matrix Proteins of Vesicular Stomatitis Virus", Journal of Virology, May 1995, p. 3156-3160, American Society for Microbiology, vol. 69, No. 5, 5 Pgs.
Hao Wu, "The Construction and Study of a Novel Recombinant Vesicular Stomatitis Virus with a Mutant of Matrix Protein Amino Acid Sites", Basic Sciences, China Master's Theses Full-Text Database, No. 2, Jan. 2018; 67 Pgs. with English Abstract.
Hao Wu, et al., "Construction and Pathogenesis of Recombinant Vesicular Stomatitis Virus with Mutations at the Amino Acid Sites of 221 and 226 in Matrix Protein", Animal Husbandry & Veterinary Medicine, vol. 50, No. 4, May 2018, pp. 77-85 with English Abstract.
International Search Report Cited in PCT/CN2021/093142, Jun. 18, 2021, 9 Pages.
Written Opinion Cited in PCT/CN2021/093142, Jun. 18, 2021, 8 Pages.

* cited by examiner

*Primary Examiner* — Sean E Aeder
(74) *Attorney, Agent, or Firm* — Cooper Legal Group, LLC

(57) ABSTRACT

The present application relates to an attenuated oncolytic virus strain, an oncolytic virus vaccine and a drug for treating tumors by combining the oncolytic virus vaccine with immune cells. The present application provides a new attenuated oncolytic virus strain by a site-directed mutation of a matrix protein M of a VSV wild-type virus. On the basis of the attenuated oncolytic virus strain, the present application further provides a vaccine that can be used in tumor treatment. On the basis of the vaccine, the present application further provide a drug that can effectively treat multiple kinds of tumors by combining the vaccine with immune cells.

8 Claims, 13 Drawing Sheets
Specification includes a Sequence Listing.

ONCOLYTIC VIRUS VACCINE AND DRUG FOR TREATING TUMORS BY COMBINING ONCOLYTIC VIRUS VACCINE WITH IMMUNE CELLS

CROSS REFERENCE TO RELATED APPLICATIONS

The present application is a continuation application of PCT application No. PCT/CN2021/093142, filed on May 11, 2021, which claims priority to China patent application No. 202010394768.7, filed on May 12, 2020. The entireties of PCT application No. PCT/CN2021/093142 and China patent application No. 202010394768.7 are hereby incorporated by reference herein and made a part of this specification.

REFERENCE TO AN ELECTRONIC SEQUENCE LISTING

The contents of the electronic sequence listing (WZF016PTEA01D2200019-SequenceListing2.xml; Size: 19,951 bytes; and Date of Creation: Apr. 27, 2023) is herein incorporated by reference.

TECHNICAL FIELD

The present application relates to the field of biomedicine, and particularly relates to an oncolytic virus vaccine and a drug for treating tumors by combining the oncolytic virus vaccine with immune cells.

BACKGROUND

National cancer statistics published by the National Cancer Center in January 2019 showed that, in 2015, there were about 3.929 million patients with malignant tumor and about 2.338 million died of malignant tumors in China. On average, more than 10,000 people were diagnosed with a cancer every day, and 7.5 people were diagnosed with a cancer every minute. Solid tumors such as liver cancer, colorectal cancer, female breast cancer and the like are still main malignant tumors in China. Malignant tumors (cancers) have become one of the major public health problems that severely threaten the population health in China. Although a great progress has been achieved in current cancer treatment, especially in multidisciplinary comprehensive treatment such as surgery, chemotherapy, radiotherapy and molecular targeted therapy, there is still no effective treatment for tumor recurrence and metastasis. Therefore, a new treatment method, namely tumor immunotherapy, is receiving increasing attention.

In 2003, Giedlin M A proposed that vesicular stomatitis virus (VSV) could be used as an oncolytic virus for tumor treatment. The principle is that it cannot interact with endogenous IFN-β in normal cells, and can only selectively proliferate and grow in tumor cells. In 2009, a study by McMaster University in Canada showed that VSV can be used as a new tumor vaccine carrier to promote immune response. In recent years, researches related to VSV has been receiving more and more attention by researchers. From a safety point of view, VSV is relatively safe to humans, and there has been no case of VSV infection in humans.

VSV is a prototypical non-segmented negative-strand RNA virus with a genome size of 11 kb encoding five proteins: nucleocapsid protein (N), phosphoprotein (P), matrix protein (M), glycoprotein (G) and large polymerase protein (L). VSV can expresses a variety of cell surface molecules, including low-density lipoprotein receptor, phosphatidylserine, sialglycolipids, and heparan sulfates, by which it can attach onto the cell surface. It is characterized by fast replication and trans-synaptic speed and ultrahigh expression of exogenous genes. Compared with other oncolytic viruses currently in development, VSV has the advantages of small genome and easiness to manipulate; a shorter replication time; an independent cell cycle; rapid growth in a broad range of cell lines and a high titer to allow a large scale production; no risk of transformation during cytoplasmic replication in host cells. This oncolytic virus will not be integrated into DNA and can avoid nervous system inflammation caused by wild-type virus after being attenuated.

In tumor model animals, studies found that VSV can significantly eliminate brain tumors, showing a significant inhibitory effect on breast cancer and osteosarcoma as well. In studying anti-tumor function and toxic side effects of VSV on a liver cancer, researchers found that a survival time of liver cancer-bearing mice was significantly increased and there was no obvious toxic side effect observed. Subcutaneous tumors and bone metastases in prostate cancer mice were significantly reduced after VSV-GP treatment; and reduction of situ tumor and lung metastases in melanoma-bearing mice was also significantly improved. M51R VSV can directly induce apoptosis of colorectal cancer cells. Meanwhile, VSV can further affect tumor development by regulating innate immunity or acquired immunity. M51R VSV reduces infiltration of immunosuppressive cells MDSCs and macrophages in colorectal cancer tissues, and increases the infiltration of $CD4^+$ T cells, thereby reducing formation of malignant ascites. VSV can induce an immune response to CD8-specific T cells and reduce an effect of other immunosuppressive cells, thereby enhancing an efficacy of tumor vaccines. The above studies show that VSV has a relatively high anti-tumor effect, and also a good safety.

A current study shows that, when VSV is used alone for tumor immunotherapy, there is a certain bottleneck in terms of a response rate of treatment, which is mainly due to an insufficient specificity and inhibitory effect of an intratumoral microenvironment. Therefore, a combination of VSV and other treatments is also increasing. In a study of papilloma mouse model, it was found that VSV combined with a tumor vaccine significantly improved an anti-tumor effect. Manish R. Patel et al. from the University of Minnesota School of Medicine published an use of JAK/STAT inhibitor (Ruxolitinib) combined with VSV-IFNβ in the treatment of a lung cancer. Results showed that Ruxolitinib combined with VSV-IFNβ achieved a better oncolytic treatment effect. Oncolytic viruses armed by multiple cytokines were also used in combination with CAR-T cell therapy, which enhanced antitumor activity in xenograft tumor models.

T cell receptor gene engineered T cells (TCR-T) therapy is based on modified T cells, being applicable to adoptive cell immunotherapy of malignant tumors, in which the TCR mediates T cells to recognize antigens presented by MHC molecules, thereby enabling antigen-specific T cells to exert immune effects on tumor target cells. Current research makes it possible to treat tumors by the use of a combination of VSV and TCR-T. VSV can lyse tumor cells through selective replication in tumor cells, and the lysed tumor cells can induce tumor-specific immune responses, promote activation, proliferation, and recruitment of T cells, which, after being activated, can kill tumor cells in the tumor by means of immune suppression regulation or the like. Theoretically, the combination of VSV and TCR-T can exert a better effect than VSV therapy or TCR-T therapy alone.

However, when VSV and TCR-T are used in combination for tumor immunotherapy, there are still at least the following problems: (1) a direct combination of a VSV wild strain or an attenuated strain with TCR-T achieves a low cure rate, showing no significantly improved treatment effect compared with either of the therapies alone; (2) a wild-type VSV still has certain risk of safety. At present, it is known to have strong neurotoxicity to rodents, and needs to be genetically modified for clinical use, so as to further reduce a pathogenic risk; and (3) random genetic modification may result in poor oncolytic effect, or failing to be successfully packaged, so that a recombinant virus cannot be produced at all.

Therefore, providing a VSV recombinant virus with good safety and high cure rate and using the same in combination with TCR-T and other immune cells as drugs has important scientific research value and application significance in the field of tumor gene therapy.

BRIEF SUMMARY

In view of this, the present application provides an oncolytic virus vaccine and a drug for treating a tumor by combining the oncolytic virus vaccine with immune cells.

In this regard, the present application adopts the following technical solution: an attenuated oncolytic virus strain having a matrix protein (M) with a gene sequence shown in SEQ ID NO: 3.

Correspondingly, an attenuated oncolytic virus strain, derived from a VSV MuddSummer subtype strain, is obtained by at least one of the following site-directed gene mutations: mutating of methionine (M) at position 51 of the amino acid sequence of the matrix protein M into arginine (R); knocking out of leucine-encoding bases (L) at position 111 of the amino acid sequence of the matrix protein M; mutating of valine (V) at position 221 of the amino acid sequence of the matrix protein M into phenylalanine (F); and mutating of serine (S) at position 226 of the amino acid sequence of the matrix protein M into arginine (R).

Correspondingly, a use of the attenuated oncolytic virus strain as a carrier in the field of medicine is provided.

In some embodiments, the use of the attenuated oncolytic virus strain in preparation of a drug or a vaccine is provided.

Correspondingly, an oncolytic virus vaccine is provided, which is prepared by inserting an antigen into the attenuated strain.

Correspondingly, an oncolytic virus vaccine is provided, which is prepared by inserting a tumor antigen into the attenuated strain.

In some embodiments, the antigen is one selected from a group consisting of: NY-ESO-1, gp33, gp100, TX103, Mucin-1, WT-1, MART-1, MAGE A1, MAGE A3, MAGE A4, MAGE B2, PRAME, SURVIVIN, MART-1, col6A3, tyrosinase, T antigen, SLC45A2, VCX/Y, HPV, alpha-fetoprotein, carcinoembryonic antigen, CA 125, Her2, Dopachrome Tautomerase, BAGE Protein, GAGE Protein, Survivin, Tyrosinase, SSX2, Cyclin-A1, KIF20A, MUCSAC, Meloe, Lengsin, Kallikrein 4, IGF2B3, Glypican 3 and other tumor antigens.

Correspondingly, a use of the oncolytic virus vaccine in preparation of a tumor immunotherapy drug is provided.

In some embodiments, the drug includes both the oncolytic virus vaccine and an immune cell, and the immune cell is a T cell, a NK cell, a macrophages or other immune cells.

In some embodiments, when the immune cell is a T cell, the T cell is one selected from a group consisting of a TCR-T cell, a CAR-T cell and a γ/δ-T cell; when the T cell is a TCR-T cell, the TCR-T cell is a TCR-T cell transfected by lentivirus or mRNA technology, or a TCR-T cell isolated from blood; when the immune cell is a NK cell, the NK cell is any one of CAR-NK cells; and when the immune cell is a macrophage, the macrophage is any one of CAR-M cells.

In some embodiments, the tumor or cancer is one selected from a group consisting of: head and neck cancer, melanoma, soft tissue sarcoma, breast cancer, esophageal cancer, lung cancer, ovarian cancer, bladder cancer, liver cancer, cervical cancer, neuroblastoma, synovial sarcoma, and round cell liposarcoma.

The present application has the following technical effects. The present application provides a novel attenuated oncolytic virus strain obtained by a site-directed mutation of the matrix protein M of the VSV wild-type virus. The attenuated strain can be used as a drug alone for treating tumors, while achieving a safety and cure rate better than a wild-type virus and other attenuated strains. The attenuated strain can also be used as a carrier (skeleton) and connected with antigens or cytokines and the like, so that substances such as the antigens or the cytokines and the like are delivered to a desired position to act as a vaccine or drug. Types of the connected antigens or cytokines depends on the types of tumors or other diseases that actually need to be treated, providing a high adaptability. On the basis of the attenuated oncolytic virus strain, the present application further provides a vaccine that can be used in tumor treatment by inserting an exogenous gene NY-ESO-1 into the attenuated strain. The vaccine has high cure rate and high biological safety. On the basis of the vaccine, the present application further provide a drug that can effectively treat multiple types of tumors by combining the oncolytic virus vaccine with a TCR-T cell. In a mouse lung cancer model, surprisingly, a cure rate of the drug can reach 95%.

In a first aspect, the present application provides an attenuated oncolytic virus strain, in which, the attenuated oncolytic virus is a VSV MuddSummer subtype strain with a matrix protein subjected to an engineering, and the engineering includes knocking out of leucine-encoding bases at position 111 of the amino acid sequence of the matrix protein M.

In some embodiments, the engineering of the matrix protein M of the attenuated oncolytic virus strain is knocking out of leucine-encoding bases at position 111 of the amino acid sequence of the matrix protein M.

In some embodiments, the engineering of the matrix protein M of the attenuated oncolytic virus strain further includes mutating of methionine at position 51 of the amino acid sequence of the matrix protein M into arginine.

In some embodiments, the engineering of the matrix protein M of the attenuated oncolytic virus strain is knocking out of leucine-encoding bases at position 111 of the amino acid sequence of the matrix protein M and mutating of methionine at position 51 of the amino acid sequence of the matrix protein M into arginine.

In some embodiments, the engineering of the matrix protein M of the attenuated oncolytic virus strain further includes mutating of valine at position 221 of the amino acid sequence of the matrix protein M into phenylalanine.

In some embodiments, the engineering of the matrix protein M of the attenuated oncolytic virus strain is knocking out of leucine-encoding bases at position 111 of the amino acid sequence of the matrix protein M and mutating of valine at position 221 of the amino acid sequence of the matrix protein M into phenylalanine.

In some embodiments, the engineering of the matrix protein M of the attenuated oncolytic virus strain further includes mutating of serine at position 226 of the amino acid sequence of the matrix protein M into arginine.

In some embodiments, the engineering of the matrix protein M of the attenuated oncolytic virus strain is knocking out of leucine-encoding bases at position 111 of the amino acid sequence of the matrix protein M and mutating of serine at position 226 of the amino acid sequence of the matrix protein M into arginine.

In some embodiments, the engineering of the matrix protein M of the attenuated oncolytic virus strain is knocking out of leucine-encoding bases at position 111 of the amino acid sequence of the matrix protein M, mutating of valine at position 221 of the amino acid sequence of the matrix protein M into phenylalanine, and mutating of serine at position 226 of the amino acid sequence of the matrix protein M into arginine.

In some embodiments, the engineering of the matrix protein M of the attenuated oncolytic virus strain is mutating of methionine at position 51 of the amino acid sequence of the matrix protein M into arginine, knocking out of leucine-encoding bases at position 111 of the amino acid sequence of the matrix protein M, mutating of valine at position 221 of the amino acid sequence of the matrix protein M into phenylalanine, and mutating of serine at position 226 of the amino acid sequence of the matrix protein M into arginine.

In some embodiments, the amino acid sequence of the matrix protein M is selected from any one of the following amino acid sequences: SEQ ID NO: 4, SEQ ID NO: 7, SEQ ID NO: 8, SEQ ID NO: 9, SEQ ID NO: 10 and SEQ ID NO: 11.

In a second aspect, the present application further provides a use of the attenuated oncolytic virus strain as a carrier in a field of medicine.

In some embodiments, the use of the attenuated oncolytic virus strain as a carrier in the medical field is the use of the attenuated oncolytic virus strain in the preparation of a drug or a vaccine.

In a third aspect, the present application provides an oncolytic virus vaccine, which is prepared by inserting an antigen into the attenuated oncolytic virus strain.

In some embodiments, the antigen is a specific tumor antigen.

In some embodiments, the antigen is one selected from a group consisting of: NY-ESO-1, gp33, gp100, TX103, Mucin-1, WT-1, MART-1, MAGE A1, MAGE A3, MAGE A4, MAGE B2, PRAME, SURVIVIN, MART-1, col6A3, tyrosinase, T antigen, SLC45A2, VCX/Y, HPV, alpha-fetoprotein, carcinoembryonic antigen, CA 125, Her2, Dopachrome Tautomerase, BAGE Protein, GAGE Protein, Survivin, Tyrosinase, SSX2, Cyclin-A1, KIF20A, MUC5AC, Meloe, Lengsin, Kallikrein 4, IGF2B3, and Glypican 3.

In a fourth aspect, the present application further provides an antitumor drug or a drug for treating cancer prepared from the oncolytic virus vaccine.

In some embodiments, the antitumor drug or the drug for treating cancer includes both the oncolytic virus vaccine and an immune cell.

In some embodiments, the immune cell is one selected from a group consisting of a T cell, a NK cell, a macrophage, a DC cell, and a TIL cell; when the immune cell is a T cell, the T cell is one selected from a group consisting of a TCR-T cell, a CAR-T cell, a γ/δ-T cell, and a gene-edited T cell; when the cell is a TCR-T cell, the TCR-T cell is a TCR-T cell transfected by lentivirus or mRNA technology, a TCR-T cell isolated from blood, or a TCR-T cell obtained by any technology; when the immune cell is a NK cell, the NK cell is a NK cell or a CAR-NK cell; and when the immune cell is a macrophage, the macrophage is a macrophage or a CAR-M cell.

In some embodiments, the tumor or cancer is is one selected from a group consisting of: head and neck cancer, melanoma, soft tissue sarcoma, breast cancer, esophageal cancer, lung cancer, ovarian cancer, bladder cancer, liver cancer, cervical cancer, neuroblastoma, synovial sarcoma, and round cell liposarcoma.

Other aspects and advantages of the present application can be easily conceived by those skilled in the art according to the following detailed description. Only exemplary embodiments of the present application are shown and described in the following detailed description. As will be realized by those skilled in the art, contents of the present application enable those skilled in the art to modify specific embodiments disclosed without departing from a spirit and a scope of inventions involved in the present application. Accordingly, description in drawings and specification of the present application is merely illustrative and not restrictive.

BRIEF DESCRIPTION OF DRAWINGS

Specific technical features of inventions involved in the present application are shown in claims. Features and advantages of inventions involved in the present application can be better understood by reference to the exemplary embodiments and drawings described in detail below. A brief description of the drawings is as follows.

FIGS. 1A-1B are schematic diagrams showing a replication ability of individual attenuated strains in LLC cells and MEF cells in vitro;

FIGS. 2A-2B are schematic diagrams showing a killing ability of individual attenuated strains in LLC cells and Hela cells in vitro;

FIG. 3 is a schematic diagram showing a killing ability of individual attenuated strains in MEF cells in vitro;

FIGS. 4A-4B are schematic diagrams showing an effect of individual attenuated strains on the expression level of IFN-β in LLC cells and MEF cells in vitro;

FIG. 5 is a schematic diagram of a construction of an oncolytic virus vaccine;

FIG. 6 is a schematic diagram showing an effect of individual attenuated strains on the volume of non-small cell lung carcinoma (transplantation tumor) in mice;

FIG. 7 is a schematic diagram showing an effect of individual vaccines on the volume of non-small cell lung carcinoma (transplantation tumor) in mice;

FIG. 8 is a schematic diagram of the volume of non-small cell lung carcinoma (transplantation tumor) in mice treated with individual attenuated strains and vaccines at the end of the experiment;

FIG. 9 is a schematic diagram showing an effect of individual attenuated strains and vaccines on a metastasis of non-small cell lung carcinoma cells in mice;

FIG. 10 is a schematic diagram showing an effect of individual vaccines on the volume of fibrosarcoma (transplanted tumor) in mice;

FIG. 11 is a schematic diagram of the volume of fibrosarcoma (transplanted tumor) in mice treated with individual vaccines at the end of the experiment;

FIG. 12 is a schematic diagram showing an effect of individual vaccines on the volume of melanoma (transplanted tumor) in mice;

FIG. 13 is a schematic diagram of the volume of melanoma (transplanted tumor) in mice treated with individual vaccines at the end of the experiment;

DETAILED DESCRIPTION

Figure 1A:
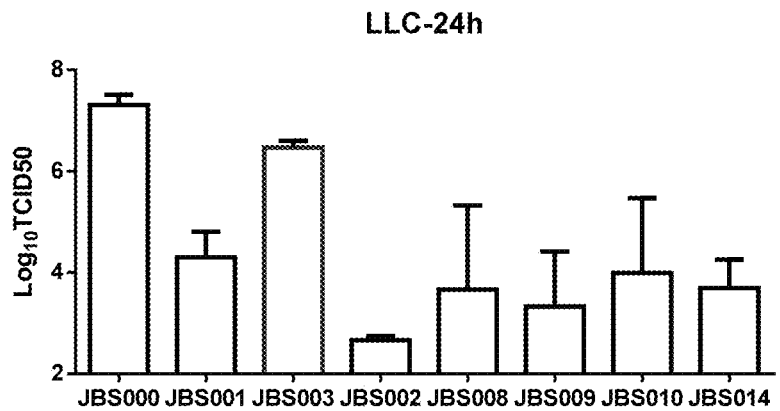
Figure 1B:
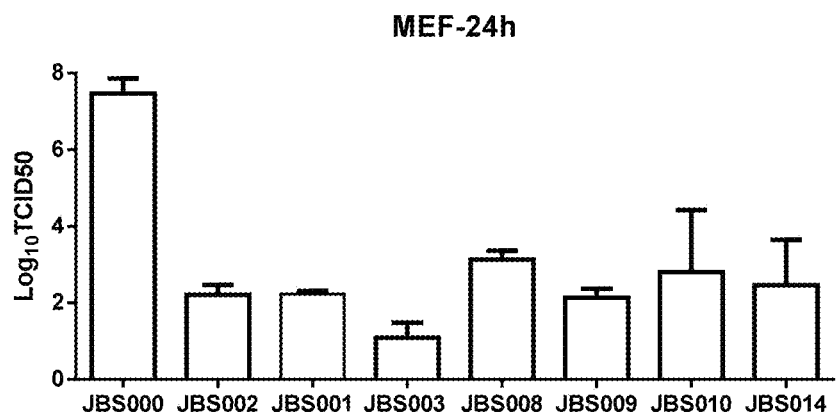
Figure 2A:
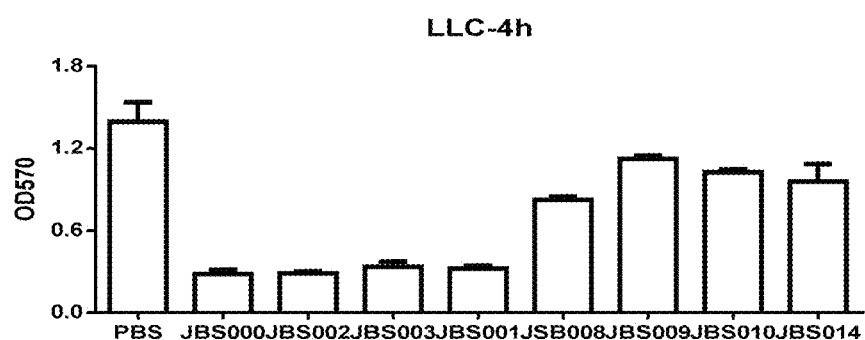
Figure 2B:
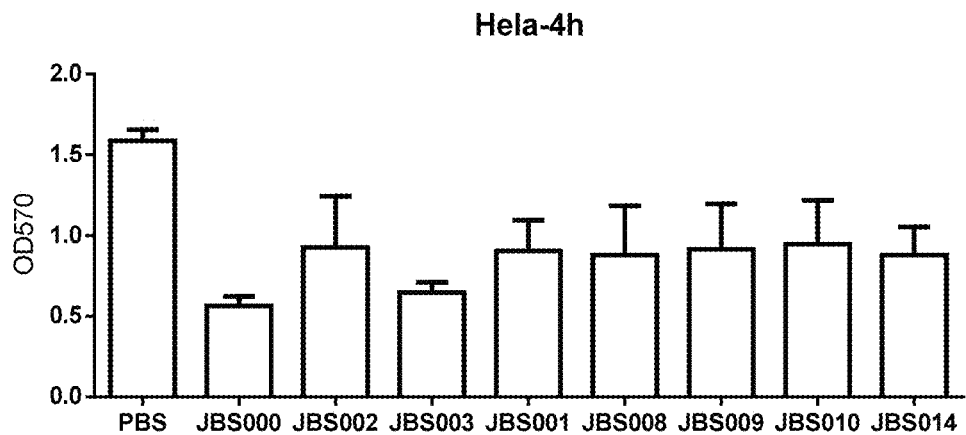
Figure 3:
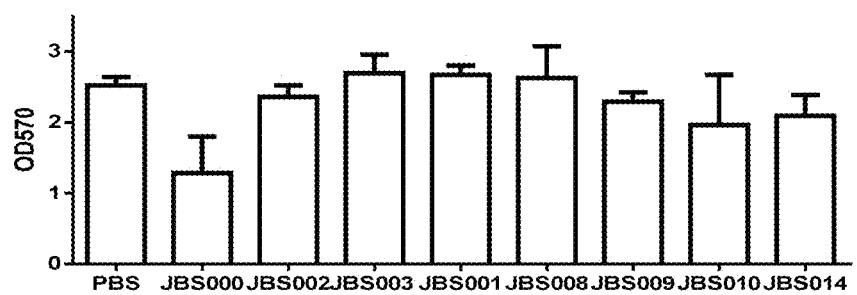

Embodiments of the inventions involved in the present application are illustrated with the following specific examples, and those skilled in the art can easily understand other advantages and effects of the inventions involved in the present application according to contents disclosed in the specification.

Definition of Terms

In the present application, a term "engineered" usually refers to changing a structure and/or a performance of a naturally occurring organism/molecule by an artificial method. The method of engineering can be, for example, modification, mutation, synthetization and/or insertion an exogenous molecule, etc. "Engineered" can be distinguished from something naturally occurring. For example, if a cell or the organism is manipulated to change a gene information thereof (for example, by introducing a new genetic material not previously present (such as by transformation, matching, somatic hybridization, transfection, transduction or other mechanisms) or by changing or removing a pre-existing genetic material (such as by substitution or deletion mutation)), then it is considered "engineered". For example, the oncolytic virus can be engineered by mutation of a gene encoding an oncolytic viral protein, by insertion an exogenous gene into an oncolytic viral gene, or by mutation of an amino acid of the oncolytic viral protein.

In the present application, a term "matrix protein M" can be used interchangeably with "M protein" and usually refers to the matrix protein of the vesicular stomatitis virus. The matrix protein M is an important virulence factor for VSV and a protein in the vesicular stomatitis virus known to interfere with an innate immune response of mice. The term "matrix protein M" further includes homologues, orthologues, variants, functional active segments and the like thereof. For example, the matrix protein M of wild-type vesicular stomatitis virus MuddSummer subtype Indiana strain can include an amino acid sequence shown in SEQ ID NO:2.

In the present application, a protein mutation site is usually expressed by "amino acid+amino acid site+(mutated amino acid)". In the present application, the mutation can include, but is not limited to, addition, substitution, deletion and/or knocking out of the amino acid. For example, a term "M51R" usually refers to mutating of a methionine M at position 51 of the amino acid sequence of the matrix protein M into arginine R.

In the present application, a term "mutation/mutating" usually refers to changing a nucleotide or amino acid sequence of a wild-type molecule. The mutations in DNA can change codons, resulting in changes in an amino acid sequence. Nucleotide changes can include a substitution, a deletion and a insertion of the nucleotide, and an alternative splicing and/or truncation of the nucleic acid sequence. Amino acid changes can include substitution, deletion, knocking out, insertion, addition and truncation of an amino acid, and processing or cutting of a protein.

In the present application, a term "tumor" usually refers to any new pathological tissue proliferation. The tumor can be benign or malignant. In the present application, the tumor can be a solid tumor and/or a hematological tumor.

In the present application, a term "include" usually refers to including explicitly specified features, but not excluding other elements.

Detailed Description of the Invention

1. An attenuated oncolytic virus strain, wherein, a matrix protein M of the oncolytic virus is engineered, and the matrix protein M after engineering has a gene sequence shown in SEQ ID NO:3.

2. An attenuated oncolytic virus strain, wherein the attenuated strain is based on VSV MuddSummer subtype strain, and is obtained after at least the following site-directed gene mutation: mutating of methionine at position 51 of the amino acid sequence of the matrix protein M into arginine; knocking out of leucine-encoding bases at position 111 of the amino acid sequence of the matrix protein M; mutating of valine at position 221 of the amino acid sequence of the matrix protein M into phenylalanine; and mutating of serine at position 226 of the amino acid sequence of the matrix protein M into arginine.

3. Use of the attenuated oncolytic virus strain of embodiment 1 or 2 as a carrier in a field of medicine.

4. The use of the attenuated oncolytic virus strain as a carrier in the field of medicine according to embodiment 3, wherein the use of the attenuated oncolytic virus strain in the preparation of a drug or a vaccine.

5. An oncolytic virus vaccine, wherein the oncolytic virus vaccine is prepared by inserting an antigen into the attenuated oncolytic virus strain of embodiment 1 or 2.

6. The oncolytic virus vaccine according to embodiment 5, wherein the antigen is a specific tumor antigen.

7. The oncolytic virus vaccine according to embodiment 6, wherein the antigen is one selected from a group consisting of: NY-ESO-1, gp33, gp100, TX103, Mucin-1, WT-1, MART-1, MAGE A1, MAGE A3, MAGE A4, MAGE B2, PRAME, SURVIVIN, MART-1, col6A3, tyrosinase, T antigen, SLC45A2, VCX/Y, HPV, alpha-fetoprotein, carcinoembryonic antigen, CA 125, Her2, Dopachrome Tautomerase, BAGE Protein, GAGE Protein, Survivin, Tyrosinase, SSX2, Cyclin-A1, KIF20A, MUCSAC, Meloe, Lengsin, Kallikrein 4, IGF2B3, and Glypican 3.

8. An antitumor drug or a drug for treating cancer prepared from the oncolytic virus vaccine of any one of embodiments 5 to 7.

9. The antitumor drug or the drug for treating cancer prepared from the oncolytic virus vaccine according to embodiment 8, wherein the drug includes both the oncolytic virus vaccine and immune cells.

10. The antitumor drug or the drug for treating cancer prepared from the oncolytic virus vaccine according to embodiment 9, wherein the immune cell is one selected from a group consisting of a T cell, a NK cell, a macrophage, a DC cell, and a TIL cell;
   when the immune cell is a T cell, the T cell is one selected from a group consisting of a TCR-T cell, a CAR-T cell, a γ/δ-T cell, and a gene-edited T cell; when the cell is a TCR-T cell, the TCR-T cell is a TCR-T cell transfected by lentivirus or mRNA technology, or a TCR-T cell isolated from blood; when the immune cell is a NK cell, the NK cell is any one of CAR-NK cells; when the immune cell is a macrophage, the macrophage is any one of CAR-M cells.

11. The antitumor drug or the drug for treating cancer prepared from the oncolytic virus vaccine according to embodiment 9 or 10, wherein the tumor or cancer is one selected from a group consisting of: head and neck cancer, melanoma, soft tissue sarcoma, breast cancer, esophageal cancer, lung cancer, ovarian cancer, bladder cancer, liver cancer, cervical cancer, neuroblastoma, synovial sarcoma, and round cell liposarcoma.

The present application provides a brand-new attenuated oncolytic virus strain prepared by precisely engineering an oncolytic virus. The oncolytic virus is vesicular stomatitis virus (VSV), is specifically selected from vesicular stomatitis virus Indiana strain, and VSV MuddSummer subtype strain. A gene sequence of a M protein of the VSV Mudd-Summer subtype strain is shown as SEQ ID NO:1, and an amino acid sequence of the M protein is shown as SEQ ID NO:2. In the present application, the vesicular stomatitis virus is modified as follows to obtain an attenuated oncolytic virus strain: performing a site-directed mutation on a gene of the M protein of the vesicular stomatitis virus to obtain an attenuated strain. The sites of mutation include: (1) methionine (M) at amino acid position 51 is mutated into arginine (R); (2) leucine-encoding bases (L) at position 111 of the amino acid sequence of the matrix protein M is knocked out; (3) valine (V) at amino acid position 221 is mutated into phenylalanine (F); (4) serine (S) at amino acid position 226 is mutated into arginine (R). The vesicular stomatitis virus after the mutation is numbered as: JBS003; and named as: XN2-M51R-ΔL111-V221F-5226R; a gene sequence of the M protein of the vesicular stomatitis virus after the mutation is shown in SEQ ID NO:3, and an amino acid sequence of the M protein of the vesicular stomatitis virus after the mutation is shown in SEQ ID NO. ID NO:4.

Compared with wild-type VSV and other known attenuated VSV strains, JBS003 is safer and can be used as a carrier (skeleton) for antigens, cytokines and other substances, and can be used as a vaccine or a drug after being combined with antigens, cytokines and the like. Meanwhile, JBS003 can also be directly used as an oncolytic virus in tumor immunotherapy without being combined with other substances, and a treatment effect is better than that of wild-type VSV and other attenuated VSV strains.

On the basis of the attenuated oncolytic virus strain, the present application provides an oncolytic virus vaccine. As mentioned above, the attenuated strains provided by the present application can be combined with antigens to form a vaccine. In the present application, inserting a gene capable of expressing a NY-ESO-1 between a G protein and an L protein of JBS003 to construct the oncolytic virus vaccine, which is numbered as: JBS004.

NY-ESO-1 (New York esophageal squamous cell carcinoma 1) belongs to a Cancer-Testis Antigen (CTA) family and is expressed in testis, ovary and various tumor tissues, but not in other normal tissues; and is a specific tumor antigen with the strongest immunogenicity. Expression abundances of NY-ESO-1 in different tumor tissues are different, and the tumors with higher protein expression are myxoid round cell liposarcoma (89%-100%), neuroblastoma (82%), synovial sarcoma (90%), melanoma (46%), and ovarian cancer (43%). The NY-ESO-1 antigen is immunogenic and safe, and is a clinically dominant antigen for immunotherapy. At present, recurrent and metastatic head and neck squamous cell carcinoma, melanoma, soft tissue sarcoma, breast cancer, esophageal cancer, lung cancer, ovarian cancer, bladder cancer, liver cancer, cervical cancer, neuroblastoma and the like still cannot be effectively treated. The JBS004 oncolytic virus vaccine constructed by introducing NY-ESO-1 can efficiently induce a specific anti-tumor immune response of a body in a peripheral lymphatic system and a tumor tissue. Test shows that in an immunotherapy for anti tumors, especially in the treatment of the above cancers and tumors, the oncolytic virus vaccine has obvious advantages in immunogenicity, effectiveness, targeting, safety and tolerance.

On the basis of the oncolytic virus, the present application further provides a drug for treating tumors in a targeted manner. The drug includes the oncolytic virus or the oncolytic virus vaccine. A use method includes: intratumorally injecting or intravenously injecting JBS003 attenuated oncolytic virus strain or JBS004 oncolytic virus vaccine. The injection is performed by a small quantity and multiple injections.

In order to improve a cure rate, in some embodiments, the drug further includes a TCR-T cell. The TCR-T cell is a T lymphocyte transfected with a NY-ESO-1 receptor, and specifically, a preparation method includes the following steps: (1) isolating T lymphocytes from a peripheral blood of a NCG-HLA-A2.1/Gpt humanized mouse; (2) artificially synthesizing a target gene of NY-ESO-1 receptor sequence, performing a gene sequencing, and recombining the target gene of NY-ESO-1 receptor sequence with a lentiviral vector to obtain a recombinant lentivirus with NY-ESO-1 receptor; (3) transfecting the T lymphocytes by using the recombinant lentivirus with NY-ESO-1 receptor to obtain a T lymphocyte transfected with the NY-ESO-1 receptor, named as: JBS-NY TCR-T. Amplifying the constructed JBS-NY TCR-T cell in vitro, and detecting a expression quantity of NY-ESO-1 in a cell of the JBS-NY TCR-T by a Western Blot method to confirm the success of construction.

The method for combining the oncolytic virus or oncolytic virus vaccine with JBS-NY TCR-T is: intravenously injecting of JBS-NY TCR-T for one time firstly, then intratumorally or intravenously injecting of the oncolytic virus or the oncolytic virus vaccine in a small amount of multiple injections.

On one hand, the present application provides an attenuated oncolytic virus strain, wherein, compared with VSV MuddSummer subtype strain, a matrix protein M of the attenuated oncolytic virus strain is engineered. In some embodiments, the matrix protein M of VSV MuddSummer subtype strain includes an amino acid sequence shown in SEQ ID NO:2. In some embodiments, the matrix protein M of VSV MuddSummer subtype strain includes a nucleic acid sequence shown in SEQ ID NO:1.

In the present application, the engineering of the matrix protein M of the attenuated oncolytic virus strain can include knocking out of leucine-encoding bases at position 111 of the amino acid sequence of the matrix protein M. In some embodiments, the leucine-encoding bases at position 111 of the amino acid sequence of the matrix protein M is knocked out of the matrix protein M of the attenuated oncolytic virus strain based on the matrix protein M of VSV MuddSummer subtype strain. In some embodiments, an amino acid sequence of the matrix protein M of the attenuated oncolytic virus strain is shown in SEQ ID NO:7.

In the present application, the engineering of the matrix protein M of the attenuated oncolytic virus strain can further include knocking out of leucine-encoding bases at position 111 of the amino acid sequence of the matrix protein M and mutating of methionine at position 51 of the amino acid sequence of the matrix protein M into arginine. In some embodiments, the leucine-encoding bases at position 111 of the amino acid sequence of the matrix protein M is knocked out and the methionine at amino acid position 51 is mutated into arginine of the matrix protein M of the attenuated oncolytic virus strain compared to the matrix protein M of VSV MuddSummer subtype strain. In some embodiments, an amino acid sequence of the matrix protein M of the attenuated oncolytic virus strain is shown in SEQ ID NO:8.

In the present application, the engineering of the matrix protein M of the attenuated oncolytic virus strain can further include knocking out of leucine-encoding bases at position 111 of the amino acid sequence of the matrix protein M and mutating of valine at position 221 of the amino acid sequence of the matrix protein M into phenylalanine. In some embodiments, the leucine-encoding bases at position 111 of the amino acid sequence of the matrix protein M is knocked out and the valine at amino acid position 221 is mutated into phenylalanine of the matrix protein M of the attenuated oncolytic virus strain based on the matrix protein M of VSV MuddSummer subtype strain. In some embodiments, an amino acid sequence of the matrix protein M of the attenuated oncolytic virus strain is shown in SEQ ID NO:9.

In the present application, the engineering of the matrix protein M of the attenuated oncolytic virus strain can further include knocking out of leucine-encoding bases at position 111 of the amino acid sequence of the matrix protein M and mutating of serine at position 226 of the amino acid sequence of the matrix protein M into arginine. In some embodiments, the leucine-encoding bases at position 111 of the amino acid sequence of the matrix protein M is knocked out and the serine at amino acid position 226 is mutated into arginine of the matrix protein M of the attenuated oncolytic virus strain based on the matrix protein M of VSV MuddSummer subtype strain. In some embodiments, an amino acid sequence of the matrix protein M of the attenuated oncolytic virus strain is shown in SEQ ID NO:10.

In the present application, the engineering of the matrix protein M of the attenuated oncolytic virus strain can further include knocking out of leucine-encoding bases at position 111 of the amino acid sequence of the matrix protein M, mutating of valine at position 221 of the amino acid sequence of the matrix protein M into phenylalanine, and mutating of serine at position 226 of the amino acid sequence of the matrix protein M into arginine. In some embodiments, the leucine-encoding bases at position 111 of the amino acid sequence of the matrix protein M is knocked out, the valine at amino acid position 221 is mutated into phenylalanine, and the serine at amino acid position 226 is mutated into arginine of the matrix protein M of the attenuated oncolytic virus strain based on the matrix protein M of VSV MuddSummer subtype strain. In some embodiments, an amino acid sequence of the matrix protein M of the attenuated oncolytic virus strain is shown in SEQ ID NO:11.

In the present application, the engineering of the matrix protein M of the attenuated oncolytic virus strain can further include knocking out of leucine-encoding bases at position 111 of the amino acid sequence of the matrix protein M, mutating of methionine at position 51 of the amino acid sequence of the matrix protein M into arginine, mutating of valine at position 221 of the amino acid sequence of the matrix protein M into phenylalanine, and mutating of serine at position 226 of the amino acid sequence of the matrix protein M into arginine. In some embodiments, the leucine-encoding bases at position 111 of the amino acid sequence of the matrix protein M is knockout, the methionine at amino acid position 51 is mutated into arginine, the valine at amino acid position 221 is mutated into phenylalanine, and the serine at amino acid position 226 is mutated into arginine of the matrix protein M of the attenuated oncolytic virus strain based on the matrix protein M of VSV MuddSummer subtype strain. In some embodiments, an amino acid sequence of the matrix protein M of the attenuated oncolytic virus strain is shown in SEQ ID NO:4.

On the other hand, the present application further provides a nucleic acid molecule encoding the matrix protein M of the oncolytic virus. For example, the nucleic acid sequence encoding the matrix protein M of the oncolytic virus can be shown in SEQ ID NO:3.

On the other hand, the present application further provides a use of the attenuated oncolytic virus strain as a carrier in a field of medicine.

In the present application, the use of the attenuated oncolytic virus strain as a carrier in the medical field can include the use of the attenuated oncolytic virus strain in the preparation of a drug or a vaccine.

On the other hand, the present application further provides an oncolytic virus vaccine, the oncolytic virus vaccine is prepared by inserting an antigen into the attenuated oncolytic virus strain. For example, the oncolytic virus vaccine can be obtained by inserting a specific tumor antigen into the attenuated oncolytic virus strain. In the present application, the antigen can be one selected from a group consisting of: NY-ESO-1, gp33, gp100, TX103, Mucin-1, WT-1, MART-1, MAGE A1, MAGE A3, MAGE A4, MAGE B2, PRAME, SURVIVIN, MART-1, col6A3, tyrosinase, T antigen, SLC45A2, VCX/Y, HPV, alpha-fetoprotein, carcinoembryonic antigen, CA 125, Her2, Dopachrome Tautomerase, BAGE Protein, GAGE Protein, Survivin, Tyrosinase, SSX2, Cyclin-A1, KIF20A, MUCSAC, Meloe, Lengsin, Kallikrein 4, IGF2B3, and Phosphatidylinositol proteoglycan 3. For example, in the present application, using the constructed attenuated oncolytic virus strain as a carrier and introducing into NY-ESO-1 to obtain the oncolytic virus vaccine.

In the present application, a method for preparing the oncolytic virus vaccine is further provided, the method including: constructing a plasmid of the attenuated oncolytic virus strain; artificially synthesizing a linked sequence with a restriction enzyme cleavage site; using biological technology and gene recombination technology, inserting the linked sequence into a non-coding region between a G protein and an L protein of the attenuated oncolytic virus strain; inserting an exogenous gene into the plasmid to obtain a recombinant plasmid of the attenuated strain carrying the exogenous gene; and constructing the oncolytic virus vaccine by a step of vaccine rescue.

On the other hand, the present application further provides an antitumor drug or a drug for treating cancer prepared from the oncolytic virus vaccine.

In the present application, the antitumor drug or the drug for treating cancer includes both the oncolytic virus vaccine and a immune cell. In the present application, the immune cell can include any one of a T cell, a NK cell, a macrophage, a DC cell, and a TIL cell; when the immune cell is a T cell, the T cell can include any one of a TCR-T cell, a CAR-T cell, a γ/δ-T cell, and a gene-edited T cell; when the T cell is a TCR-T cell, the TCR-T cell can include any one of a TCR-T cell transfected by lentivirus or mRNA technology, a TCR-T cell isolated from blood, or a TCR-T cell obtained by any technology; when the immune cell is a NK cell, the NK cell can include any one of a NK cell or a CAR-NK cell; when the immune cell is a macrophage, the macrophage can include any one of a macrophage or a CAR-M cell. In the present application, the tumor or cancer can include any one of head and neck cancer, melanoma, soft tissue sarcoma, breast cancer, esophageal cancer, lung cancer, ovarian cancer, bladder cancer, liver cancer, cervical cancer, neuroblastoma, synovial sarcoma and/or round cell liposarcoma. In the present application, the drug can further include a pharmaceutically acceptable carrier optionally.

Without intending to be limited by any theory, the following examples are only used to illustrate the various technical solutions of the inventions involved in the present application, but are not used to limit the scope of the inventions involved in of the present application.

EXAMPLES

Example 1

1. According to the methods in Table 1, a site-directed mutation was performed on vesicular stomatitis virus Indiana strain, and then 7 groups of mutated attenuated strain were obtained. As a control, the group without gene mutation is numbered as JBS000.

TABLE 1

Mutation status in each group

| No. of Attenuated Strain | Name of Vaccine | Mutation Site and Amino Acid after Mutation | No. of Mutation Sites |
|---|---|---|---|
| JBS000 | XN2-WT | / | / |
| JBS001 | XN2-M51R | methionine M at amino acid position 51 was mutated into arginine R | 1 |
| JBS002 | XN2-M51R-ΔL111 | 1. methionine M at amino acid position 51 was mutated into arginine R; 2. leucine L -encoding bases at position 111 of the amino acid sequence of the matrix protein M was knockout. | 2 |
| JBS003 | XN2-M51R-ΔL111-V221F-S226R | 1. methionine M at amino acid position 51 was mutated into arginine R; 2. leucine L -encoding bases at position 111 of the amino acid sequence of the matrix protein M was knockout; 3. valine V at amino acid position 221 was mutated into phenylalanine F; 4. serine S at amino acid position 226 was mutated into arginine R. | 4 |
| JBS008 | XN2 - ΔL111 | leucine L -encoding bases at position 111 of the amino acid sequence of the matrix protein M was knockout; | 1 |
| JBS009 | XN2 - ΔL111-V221F | 1. leucine L -encoding bases at position 111 of the amino acid sequence of the matrix protein M was knockout; 2. valine V at amino acid position 221 was mutated into phenylalanine F. | 2 |
| JBS010 | XN2 - ΔL111-S226R | 1. leucine L -encoding bases at position 111 of the amino acid sequence of the matrix protein M was knockout; 2. serine S at amino acid position 226 was mutated into arginine R. | 2 |
| JBS014 | XN2-ΔL111-V221F-S226R | 1. leucine L -encoding bases at position 111 of the amino acid sequence of the matrix protein M was knockout; 2. valine V at amino acid position 221 was mutated into phenylalanine F; 3. serine S at amino acid position 226 was mutated into arginine R. | 3 |

Specifically, a construction method of the attenuated strain was a conventional technology in the field, which was simply described as follows.

(1) Constructing the plasmids. Using pVSV-XN2 plasmid as a template, and different mutation sites described in Table 1 were introduced by PCR method. PCR was performed by using the plasmids and primers of the mutation sites together, and PCR products were subjected to 1% agarose gel electrophoresis, and then a extraction to cut gels was performed by using a gel extraction kit, thereby the plasmids with different mutations of the matrix protein M were obtained.

Figure 4A:
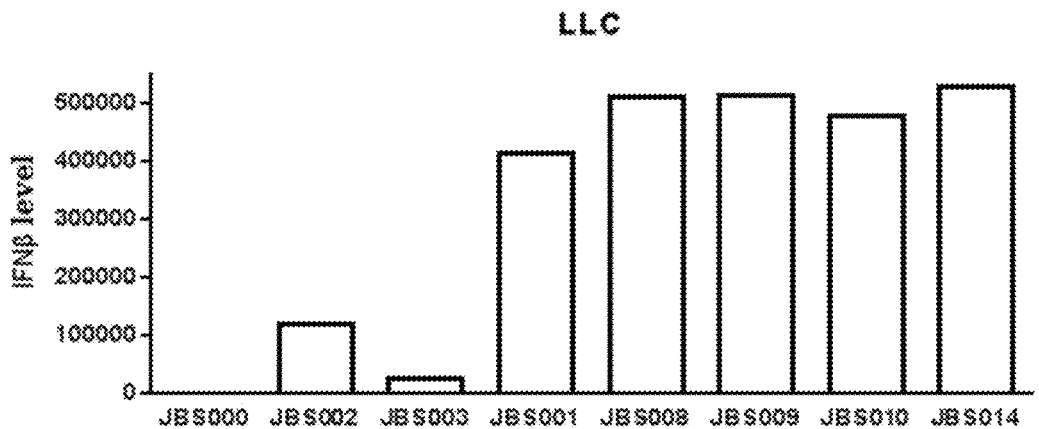
Figure 4B:
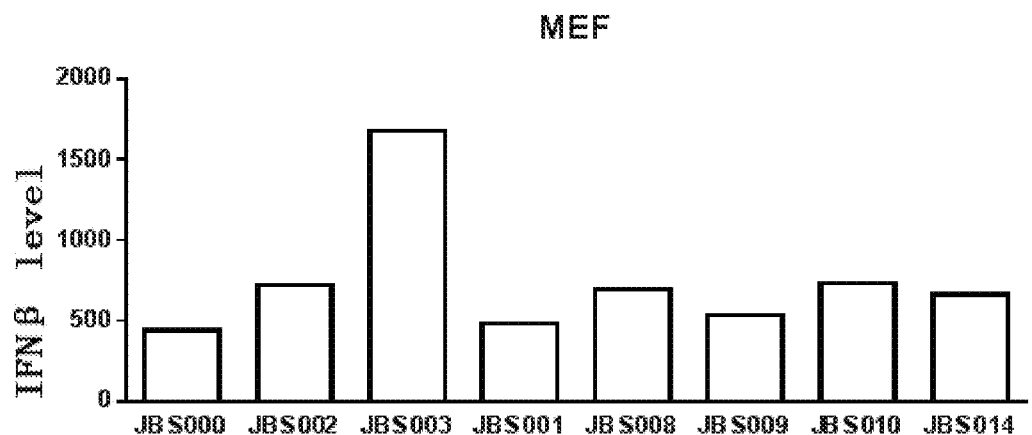
Figure 5:
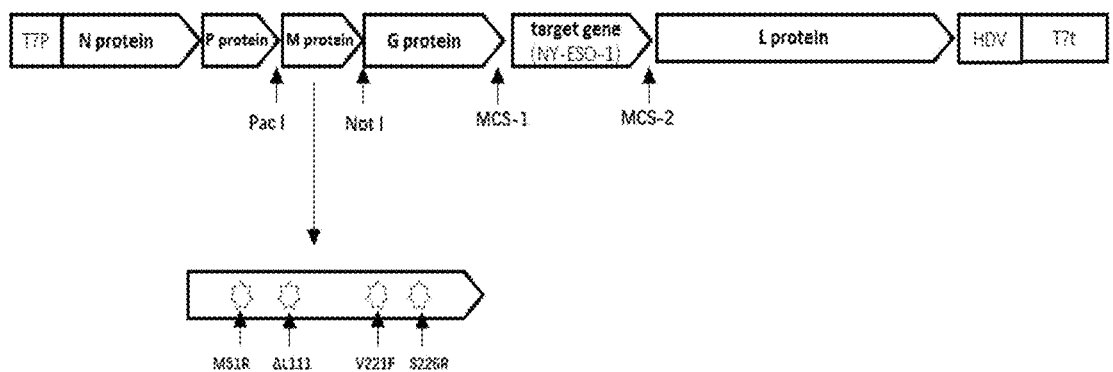

(2) Virus rescue. At MOI=5, BHK-21 cells were inoculated by inflecting with poxvirus vTF7-3 expressing T7 RNA polymerase. After 1 hour of the infection, BHK-21 cells were rinsed once with DPBS buffer. Then, a plasmid transfection premix was prepared, and the plasmid transfection premix specifically included: pBS-N, pBS-P, pBS-L and the mutated plasmid prepared in step (1). In which, pBS-N, pBS-P and pBS-L respectively refers to the expression plasmid cloned with VSV N, VSV P and VSV L protein genes, and respectively expresses N, P and L proteins needed for the virus rescue. A plasmid transfection was performed according to a method described in a user manual of lipofectamine 2000. After 4 hours, a fresh DMEM complete medium containing 10% of fetal bovine serum was replaced; after 48h, a supernate was collected, and then the poxvirus was removed by filtering through a 0.22 μm filter membrane. A filtrate was added into the fresh BHK-21 cells; then cell pathological changes were observed every day, and a supernate was collected when the cells occurred pathological changes. After confirmed successfully by using RTPCR, the virus was purified by virus plaque assay. Thereby, the attenuated strain was obtained.

(3) M protein sequencing. A viral genome RNA was extracted with Trizol kit, and a reverse transcription reaction was performed with random primers, and then a reverse transcribed cDNA was subjected to PCR with the primer designed for the gene sequence of M protein. Sequences of the primer were 5'-AAAAAAGTAACAGATATCAC-3' (SEQ ID NO: 5); 5'-ACATTTTTCCAGTTTCCTTTTTGG-3'(SEQ ID NO: 6). A product was extracted after 1% agarose gel electrophoresis and sent to a sequencing company for sequencing.

2. Ability of different attenuated strains to infect cells in vitro. 200 pfu JBS000, 200 pfu JBS001, 200 pfu JBS002, 200 pfu JBS003, 200 pfu JBS008, 200 pfu JBS009, 200 pfu JBS010 and 200 pfu JBS014 were added into MEF cell (human fibroblast) culture solution and LLC cell (mouse non-small cell lung cancer cell) culture solution respectively, and 50% tissue culture infection dose (TCID50) produced by the attenuated strains in each group was detected. Specifically, a detecting method was as follows.

(1) 3 mL of cell suspension was added into each well of a 6-well culture plate to make a cell number reach $4\times10^5$/well for 6 wells in total, and then cultured for 16h under a condition of 37° C. and 5% of $CO_2$.

(2) 200 pfu JBS000, 200 pfu JBS001, 200 pfu JBS002, 200 pfu JBS003, 200 pfu JBS008, 200 pfu JBS009, 200 pfu JBS010 and 200 pfu JBS014 were added into each well respectively, and 2 wells were set for normal cell control. At 24 hours, 100 μL of a cell supernate was taken.

(3) 100 μL of Vero cell suspension was added into each well of a 96-well culture plate to make the cell number reach $1\times10^4$/mL, and cultured for 16h under the condition of 37° C. and 5% of $CO_2$.

(4) The supernate obtained in step (2) was diluted at a 10-fold dilution ratio serially in a 1.5m LEP tube, a total of 11 titers ranging from $10^{-1}$-$10^{-11}$ were obtained.

(5) The diluted supernates were inoculated into the 96-well culture plate in step (3), and one column (8 wells in total) for each dilution was inoculated, and 100 μL was inoculated in each well. One column for normal cell was set as a control group.

(6) A fluorescence of cells in each well was observed after 48 hours, if there was the fluorescence, then the well was marked with being infected.

(7) TCID50 was calculated according to Karber method.

Results were shown in FIG. 1A and FIG. 1B. A replication and amplification ability of each constructed attenuated oncolytic virus strain in the lung cancer cells (LLC) in vitro was stronger r than that of the attenuated oncolytic virus strain in the normal fibroblasts (MEF). In which, JBS003 had the stronger replication and amplification ability in lung cancer cells (LLC) in vitro, and a number of virus particles produced after 24 hours of the infection was close to that of wild type viruses. However, in the normal fibroblasts (MEF), the replication and infection ability of each attenuated oncolytic virus strain was decreased. Thus, JBS003 carrier has a stronger specific infection ability to the tumor cells.

3. Killing ability of different attenuated strains on cells in vitro. Different cells were infected with a same amount of each attenuated strain in vitro, and a cell viability was detected by MTT method after 24 hours. Specifically, the method was as follows.

(1) 100 μL of cell suspension was added into each well of the 96-well culture plate to make the cell number reach $1\times10^4$/well, and cultured for 16h under the condition of 37° C. and 5% of $CO_2$. Kinds of detected cells were LLC, MEF and Hela (human tumor cells).

(2) JBS000, JBS001, JBS002, JBS003, JBS008, JBS009, JBS010, and JBS014 were diluted to MOI (multiplicity of infection) of 0.001, 0.01, 0.1, and 1.0 respectively, and each dilution titer was inoculated in 4 wells, and 100 μL was inoculated in each well, then cultured for 40h under the condition of 37° C. and 5% of $CO_2$.

(3) A supernate in the 96-well culture plate was removed, and the fresh DMED medium was added, then 5 mg/mL MTT solution was added, 20 μL/well. Cultured for 4h under the condition of 37° C. and 5% of $CO_2$.

(4) The 96-well culture plate was centrifuged for 5 minutes at 2500 g/min and at a room temperature. Then, The supernatant was gently removed using 1 mL disposable sterile syringe.

(5) DMSO was added into each well, 100 μL/well, and placed for 10 minutes at 37° C.

(6) An OD value of each well at a wavelength of 570 nm was measured using a multifunctional microplate reader with shake for 2 minutes.

Results were shown in FIG. 2A, FIG. 2B and FIG. 3. The results indicated that all of the attenuated oncolytic virus strains had a good ability to kill the tumor cells and had no significant killing ability to MEF cells, except for JBS000. That is, in vitro, all of the attenuated strains except JBS000 had specific killing effect on the tumor cells, and had no significant effect on the normal cells.

Testing on elimination of different attenuated strains in the cells w using IFN-β as a indicator. The cells were cultured and the attenuated strains were added according to step (1) and (2) in step 3. Then, the cells in each group were broken, and total RNA was extracted from each cell by using TRIzol (Invitrogen), and reverse transcribed into cDNA by using reverse transcription kit of PrimeScript RT Reagent Kit with DNA Eraser (Takara), then dyed with dyestuff of LightCycler 480SYBR Green I Master (Roche), and a Ct value of each gene was detected by using LightCycle 480 quantitative PCR instrument. Relative expression levels of target genes IFN-β and VSV-G were calculated by ΔΔ Ct method, and results were shown in FIG. 4. In LLC cell lines, all of the attenuated strains except JBS000 can cause an improvement of an expression level of IFN-β, in which, JBS003 carrier had the lowest regulatory ability; however, in the MEF cells, all of the viruses can improve the expression level of IFN-β, in which, the expression level in JBS003 was highest, which was 3 times in the wild type virus carrier (JBS000). That is, JBS003 was difficult to be eliminated in the tumor cells but easy to be eliminated in the normal cells. broken Example 2 Construction and Effect of Oncolytic Virus Vaccine 1. Base on the attenuated strain prepared in Example 1 and wild-type virus, the NY-ESO-1 gene was inserted to construct an oncolytic virus vaccine. A schematic diagram of the construction was shown in FIG. 5. Inserted gene segments in each group were shown in Table 2.

TABLE 2

Inserted gene segments in each group

| No. of Vaccine | Name of Vaccine | Corresponding attenuated strain |
|---|---|---|
| JBS004 | XN2-M51R-ΔL111-V221F-S226R-NY-ESO-1 | JBS003 + NY-ESO-1 |
| JBS005 | XN2-M51R-ΔL111-NY-ESO-1 | JBS002 + NY-ESO-1 |
| JBS006 | XN2-M51R-NY-ESO-1 | JBS001 + NY-ESO-1 |
| JBS007 | XN2-WT-NY-ESO-1 | JBS000 + NY-ESO-1 |
| JBS011 | XN2- ΔL111-NY-ESO-1 | JBS008 + NY-ESO-1 |
| JBS012 | XN2 -ΔL111-V221F-NY-ESO-1 | JBS009 + NY-ESO-1 |
| JBS013 | XN2 -ΔL111-S226R-NY-ESO-1 | JBS010 + NY-ESO-1 |
| JBS015 | XN2 -ΔL111- V221F-S226R-NY-ESO-1 | JBS014 + NY-ESO-1 |

Specifically, preparation methods of JBS004-JBS007, JBS011-JBS013 and JBS015 were conventional technology in the art, which were described as follows. It should be note that, the following descriptions do not limit that JBS004-JBS007, JBS011-JBS013 and JBS015 can prepared only according to the following methods, but give examples.
  (1) Constructing the plasmids of the attenuated strain. Link sequences with restriction enzyme cutting sites Xho I and Mlu I were synthesized artificially, and were inserted into non-coding regions between G protein and L protein of each of the attenuated strains prepared in Example 1 by using biological technology and gene recombination technology, then the plasmids of the attenuated strains were obtained.
  (2) Inserting the exogenous gene. Each of the plasmids of the attenuated strains was double digested with Xho I and Mlu I, and then the NY-ESO-1 exogenous gene was inserted to obtain recombinant plasmids of the attenuated strains carrying NY-ESO-1.
  (3) Vaccine rescue. The vaccine corresponding to each of the recombinant plasmids of the attenuated strains was rescued by referring to the method of "virus rescue" in Example 1, then the oncolytic virus vaccines were constructed.
2. Treatment Effects on LLC-NY-ESO-1 Non-Small Cell Lung Cancer (Transplanted Tumors).
  136 C57BL/6 mice with no significant difference were selected, and subcutaneously inoculated $2\times10^5$ of LLC cells (lung cancer cells of mouse), and cultured for 9 days under the same and appropriate conditions. On 9th day of the inoculation, when the volume of the transplanted tumor was about 100 $mm^3$, all of the mice were divided into 17 groups (n=8); the mice in a control group (PBS group) were injected with 50 μL of PBS intratumorally, and the remaining 16 groups were treated groups, in which the mice were intratumorally inoculated of JBS000, JBS001, JBS002, JBS003, JBS004, JBS005, JBS006, JBS007, JBS008, JBS009, JBS010, JBS011, JBS012, JBS013, JBS014 and JBS015 respectively, and an administration was performed once every 2 days for 3 times in total, and a single dose was $10^7$ pfu/mouse. From beginning of the administration to an end of the experiment, the volume of the transplanted tumor was recorded every 2 days. The volume ($mm^3$)=(long diameter× short $diameter^2$)/2. A metastatic proportion of the cancer cells was detected by the following detection method: LLC cells have red fluorescent protein, which will show yellow fluorescence under a green fluorescent microscope; when the cancer cells had metastasized to a lung tissue, the lung tissue was placed under the microscope, and fluorescent pictures were taken, and then a gray value of the pictures was analyzed by Image J to analyze a proportion of the lung cancer cells, thereby the metastatic proportion of the cancer cells was obtained.

Figure 6:
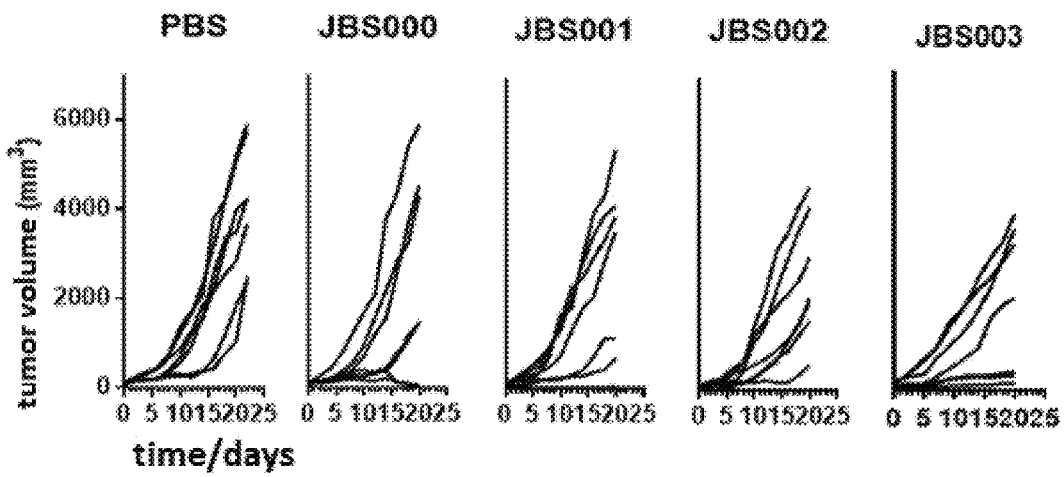
Figure 7:
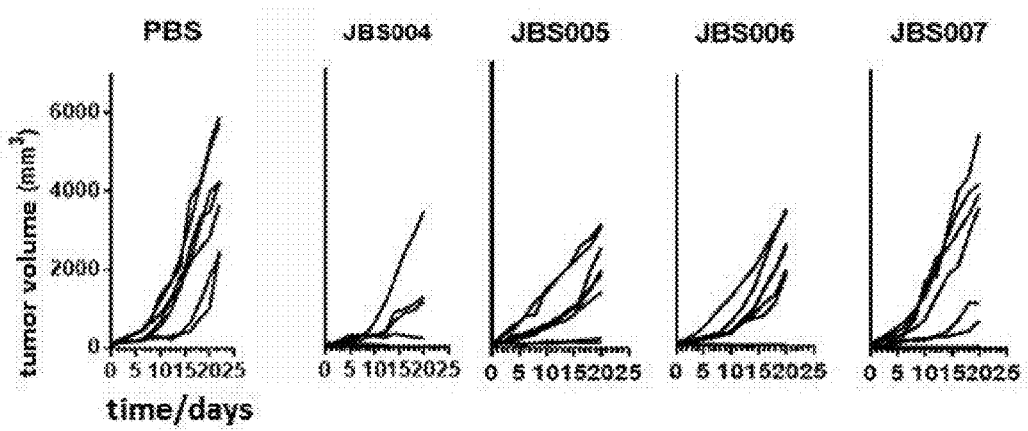
Figure 8:
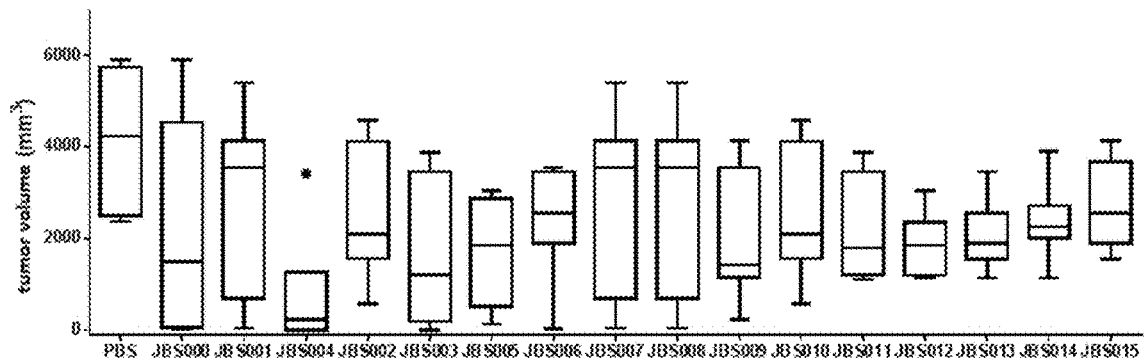
Figure 9:
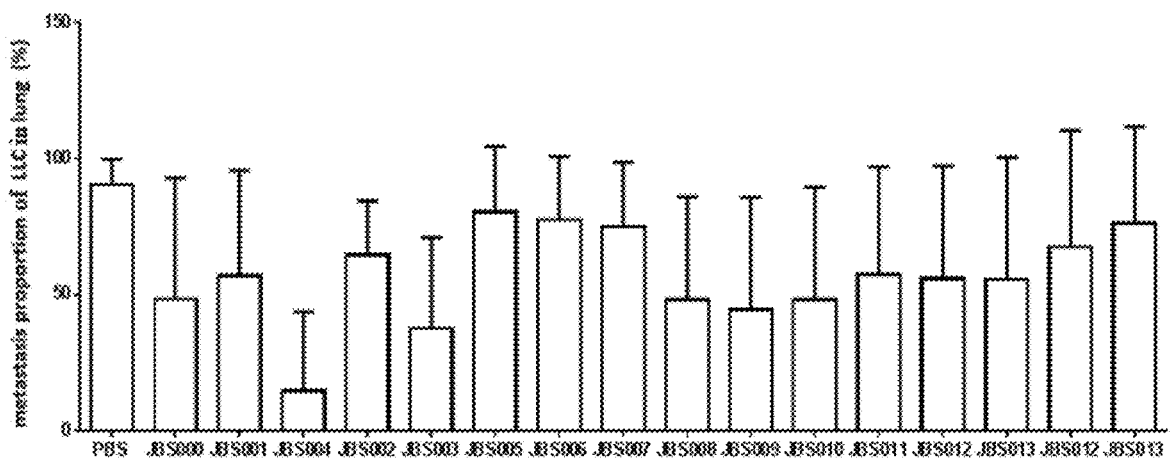

Changes in the tumor volumes were shown in FIGS. 6-8. Results indicated that all treated groups had certain inhibitory effects on the transplanted tumor. In which, one mouse in JBS003 group was completely cured. The cure rate of JBS004 to the transplanted tumor was 37.5%. The metastasis of cancer cells were shown in FIG. 9. It can be seen from FIGS. 6-9 that there was a certain correlation between the volume of the transplanted tumor and the metastasis proportion in lung. The treatment effect of JBS003 on the metastases in lung was better than that of JBS000 and JBS001; the ability of JBS004 to inhibit or prevent the metastasis of lung cancer cells was better than other groups.
3. Treatment Effects on MCA-205-NY-ESO-1 Fibrosarcoma (Transplanted Tumor).

Figure 10:
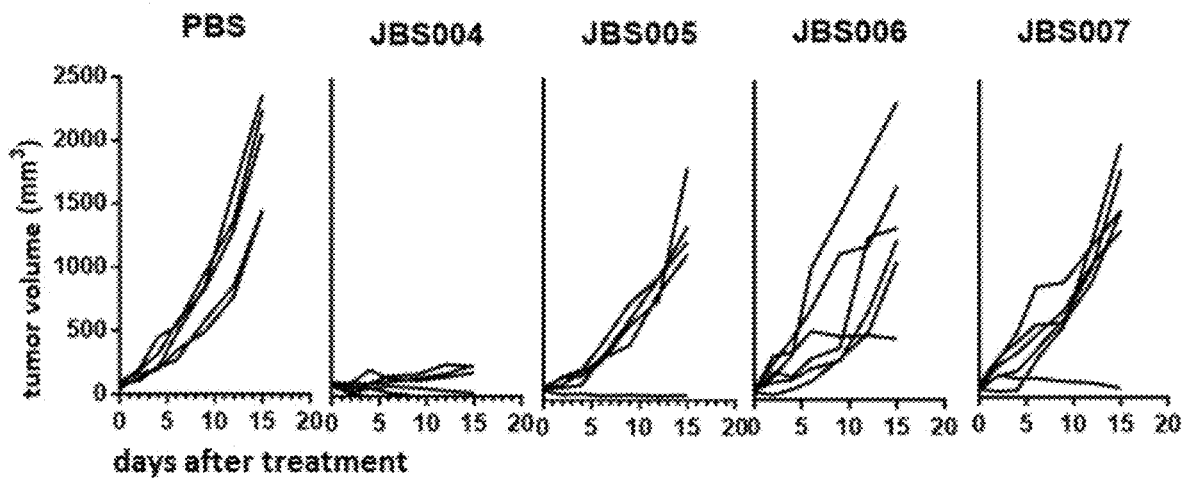
Figure 11:
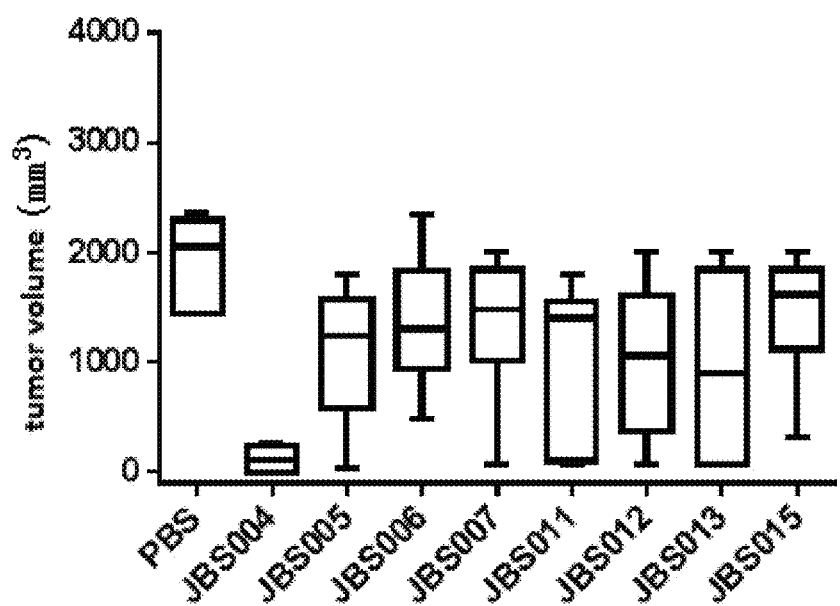

The mice were treated according to the method of "treating LLC-NY-ESO-1 non-small cell lung cancer transplanted tumor", and $10^6$ of MCA-205-NY-ESO-1 fibrosarcoma cells were subcutaneously inoculated, and the mice were treated when the volume of the transplanted tumor was about 100 $mm^3$. Similarly, intratumoral injection of 50 μL of PBS as the control group. In the treated groups, JBS004, JBS005, JBS006, JBS007, JBS011, JBS012, JBS013, and JBS015 were intratumorally inoculated respectively; and 6 mice in each group, and the administration was performed once every two days for 3 times in total at the single dose of $10^8$ pfu/mouse. From the beginning of the administration to the end of the experiment, the volume of the transplanted tumor was recorded every 2 days. Results were shown in FIG. 10 and FIG. 11.

The results indicated that all of the treated groups can reduce the tumor volume to a certain extent. After treatment with JBS004, the transplanted tumors in 2 mice were completely eliminated (33.33%), and the tumor volumes of the remaining mice were also well controlled, which were significantly different from the other groups. A total response rate of JBS004 in the treatment of fibrosarcoma was 100%.
4. Treatment Effects on B16-F10-NY-ESO-1 Melanoma (Transplanted Tumor).

Figure 12:
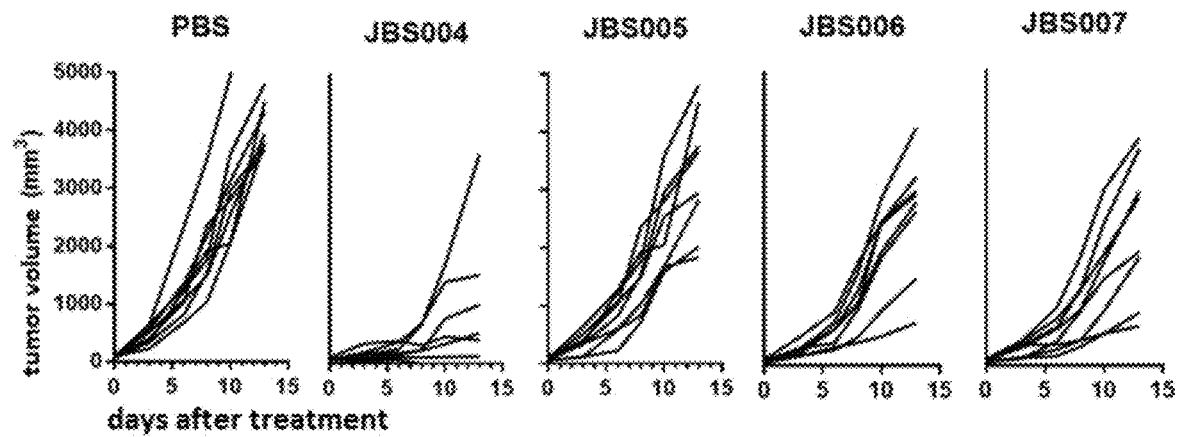
Figure 13:
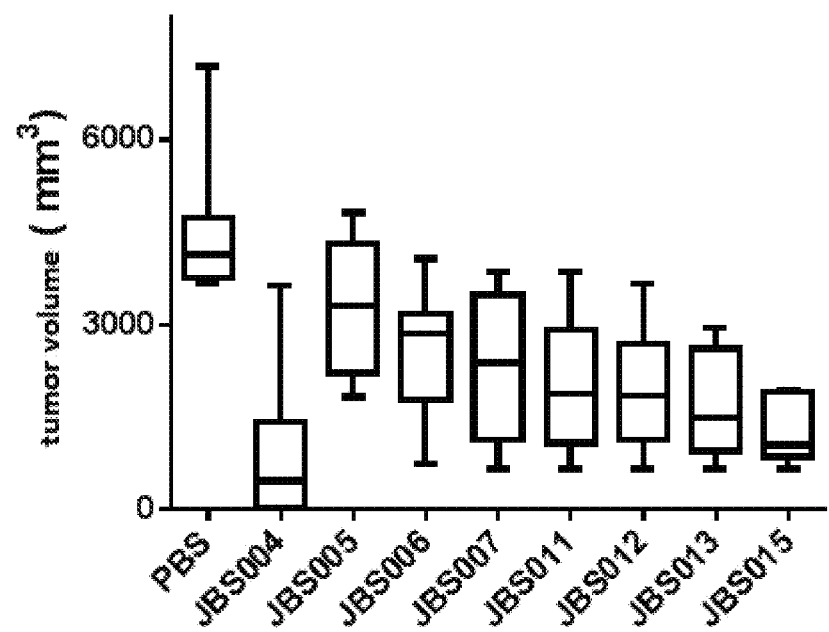

The mice were treated according to the processing method in the transplanted tumor testing described above, and $2\times10^6$ of B16-F10-NY-ESO-1 melanoma cells were subcutaneously inoculated, and the mice were treated when the volume of the transplanted tumor was about 100 mm³. Similarly, intratumoral injection of 50 μL of PBS as the control group. In the treated groups, JBS004, JBS005, JBS006, JBS007, JBS011, JBS012, JBS013 and JBS015 were intratumorally inoculated respectively, and 6 mice in each group, and the administration was performed once every two days for 3 times in total at the single dose of $10^8$ pfu/mouse. From the beginning of the administration to the end of the experiment, the volume of the transplanted tumor was recorded every 2 days. Results were shown in FIG. 12 and FIG. 13. The results indicated that all of the treated groups had certain treatment effects on melanoma, especially the treatment effect of JBS004 group was the best.

5. Effects of JBS004 at Different Doses.

Figure 14:
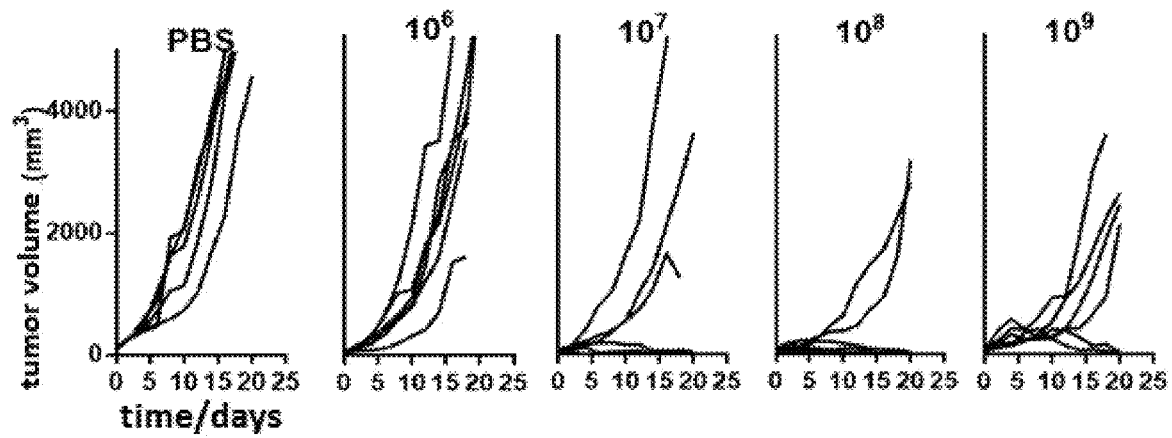
FIG. 14 is a schematic diagram showing an effect of JBS004 at different doses on the volume of non-small cell lung carcinoma (transplanted tumor) in mice.
Figure 15:
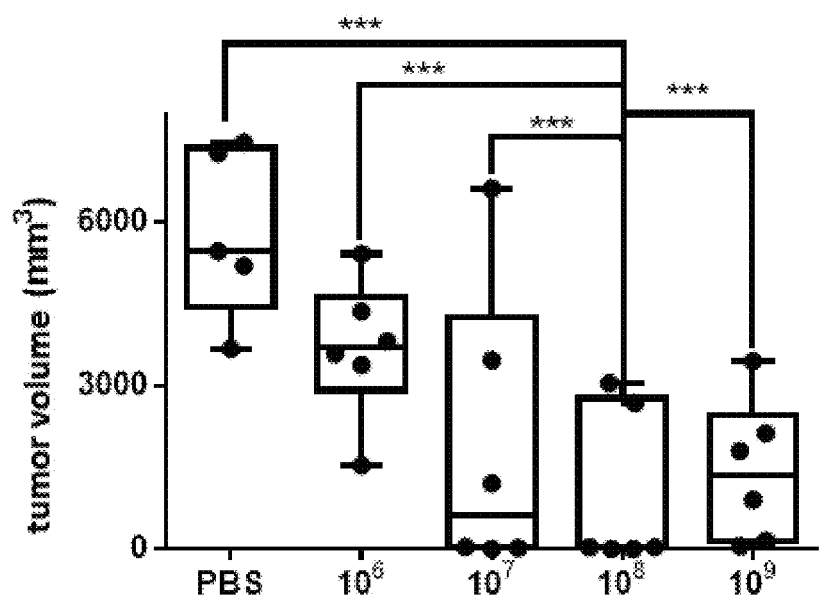
FIG. 15 is a schematic diagram of the volume of non-small cell lung carcinoma (transplanted tumor) in mice treated with JBS004 at different doses at the end of the experiment.
Figure 16:
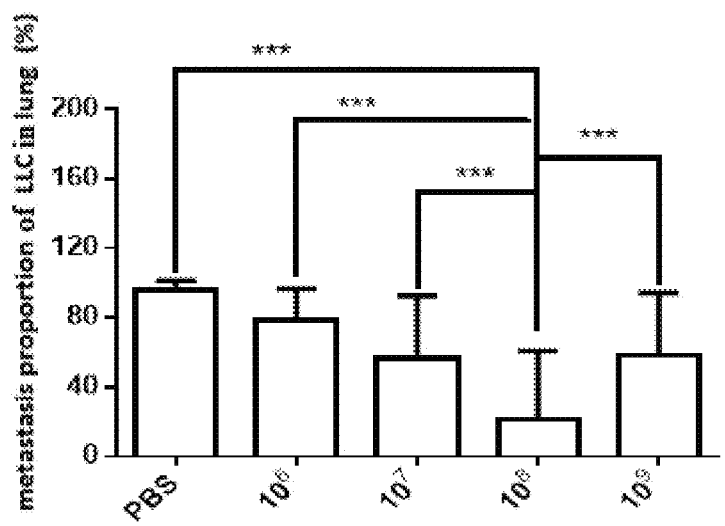
FIG. 16 is a schematic diagram showing an effect of JBS004 at different doses on a metastasis of non-small cell lung carcinoma cells in mice.

C57BL/6 mice aged 6-8 weeks and weighed about 18 g were selected, and $2\times10^5$ of LLC cells (lung cancer cells of mouse) were subcutaneously inoculated respectively. On 9th day of the inoculation, when the volume of the transplanted tumor was about 100 mm³, all of the mice were divided into 5 groups with 6 mice in each group; the mice in a control group (PBS group) were injected with 50 μL of PBS intratumorally, and the remaining 4 groups were treated groups, in which the mice were intratumorally inoculated of JBS004 at $10^6$ pfu/mouse, $10^7$ pfu/mouse, $10^8$ pfu/mouse, and $10^9$ pfu/mouse respectively, and the administration was performed once every 2 days for 3 times in total. From the beginning of the administration to the end of the experiment, the volume of the transplanted tumor was recorded every 2 days. Results were shown in FIG. 14 and FIG. 15. At the end of the experiment, the mice were euthanized and autopsied, and the lung tissues of the mice were taken to detect the metastatic proportion of the cancer cells. Results were shown in FIG. 16.

The results indicated that JBS004 at different doses have certain treatment effects on the mice with lung cancer. In which, under the dose of $10^8$ pfu/mouse, the cure rate was 33.33%, and an effective control rate was 33.33%, and a rate of no lung cancer cell metastasis was 66.67%, which was significantly better than other dose groups.

Figure 17:
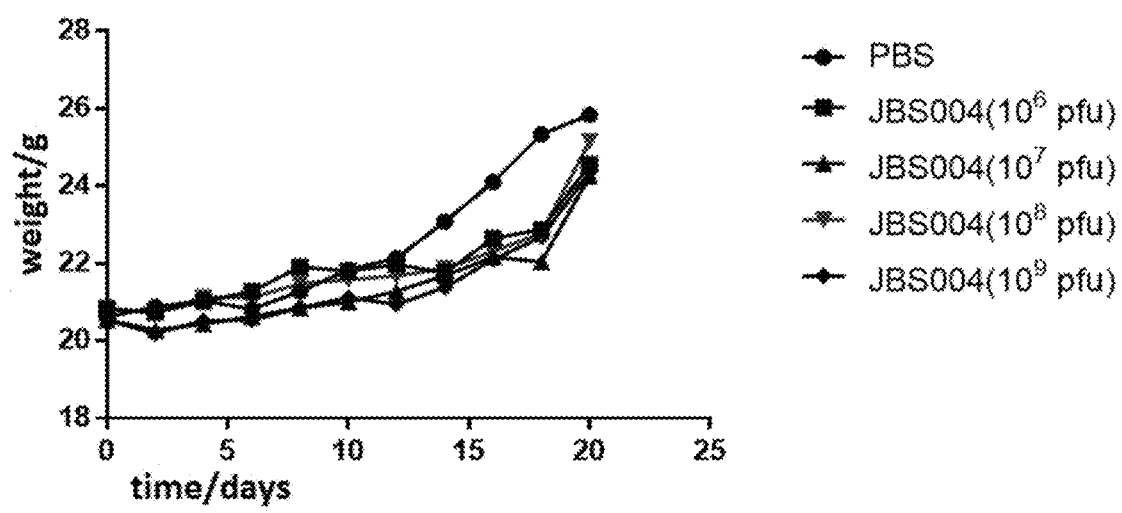
FIG. 17 is a schematic diagram of an effect of JBS004 at different doses on a body weight of mice with lung cancer.
Figure 18:
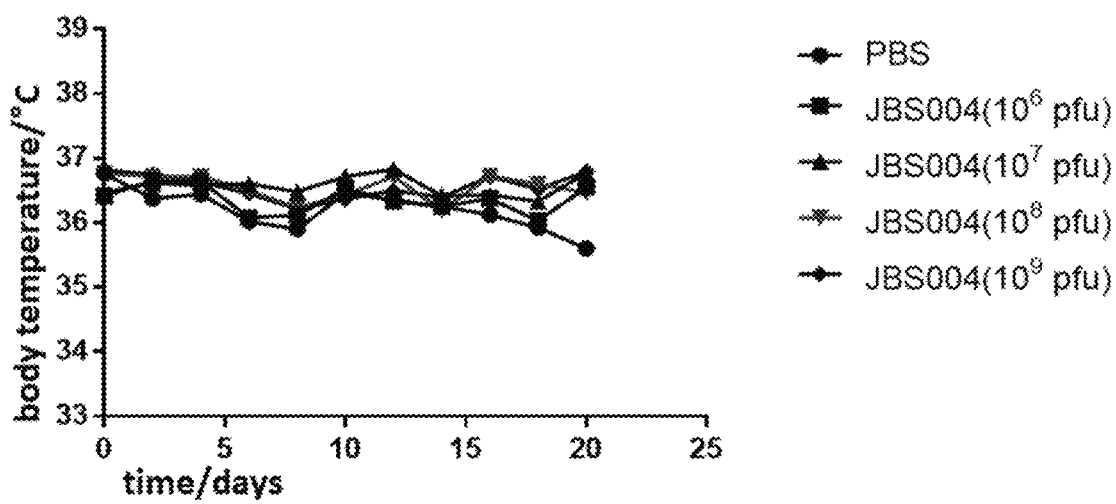
FIG. 18 is a schematic diagram of an effect of JBS004 at different doses on a temperature of mice with lung cancer.

Additionally, as shown in FIG. 17 and FIG. 18, during the whole experiment, a body temperature and a weight of the mice were kept within a normal range, and there was no abnormal body temperature and the weight, indicating that JBS004 at different doses had no significant effect on the body temperature and the weight of the mice with lung cancer. In terms of the weight, the weight of the mice in the PBS group increased steadily, but the weight of the mice in each of the treated groups increased slowly, which should be related to a reduction of the volume of the transplanted tumor. At the end of the experiment, there was no significant difference in the weight of the mice in each group, which proved that JBS004 was safe.

Example 3 Test Results of Pharmacokinetics and Acute Toxicity of JBS004

Figure 19:
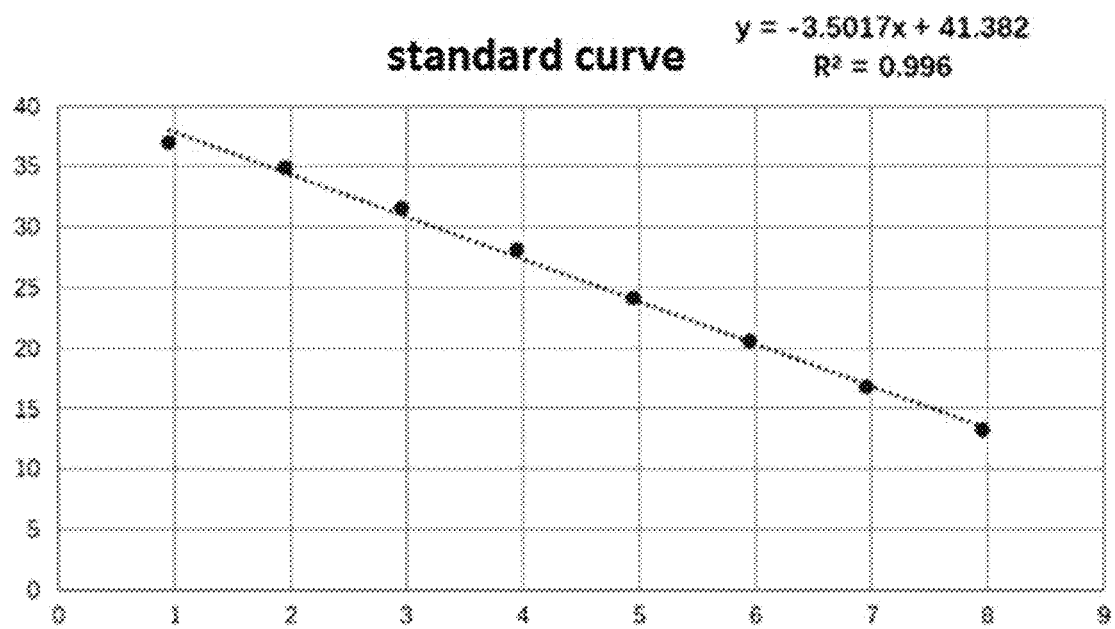
FIG. 19 is a quantitative standard curve obtained by PCR detection method.
Figure 20:
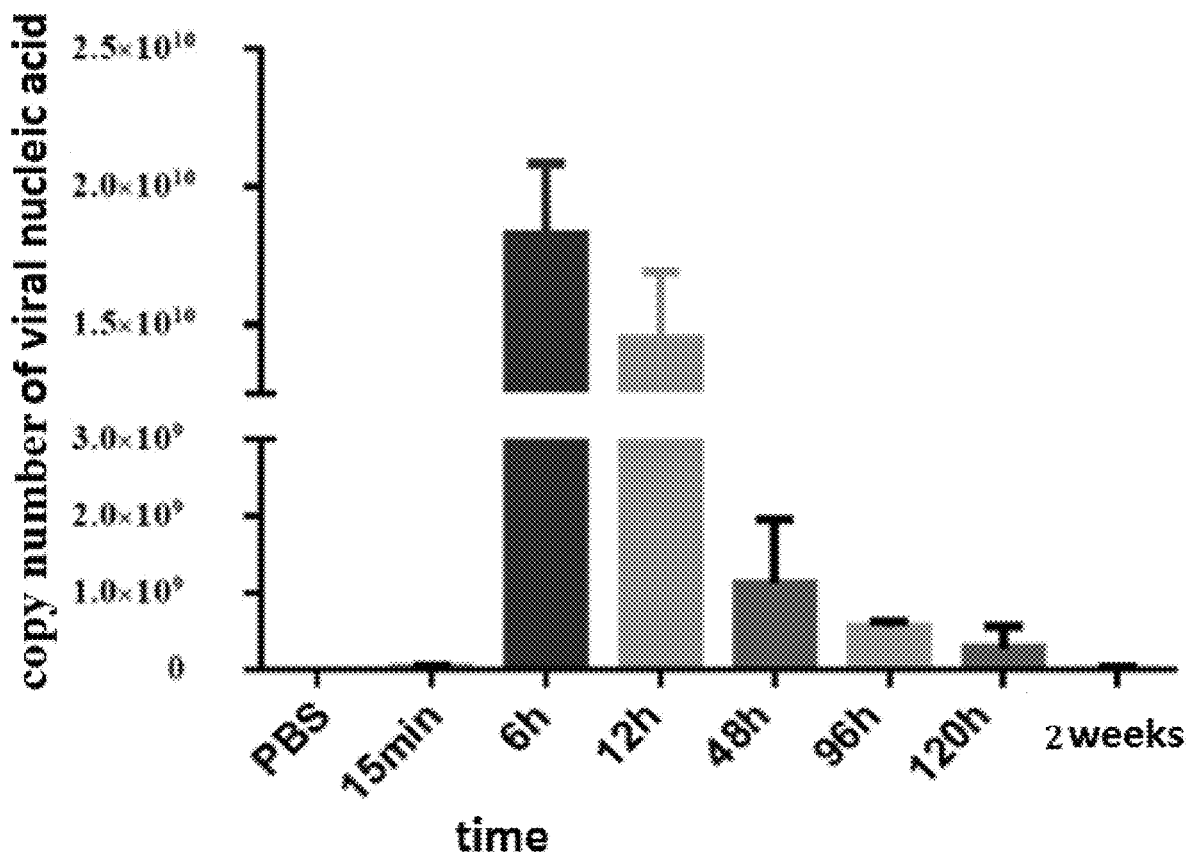
FIG. 20 is a schematic diagram of a copy number of nucleic acid of JBS004 in the tumor at different time points in a LLC transplanted tumor model.
Figure 21:
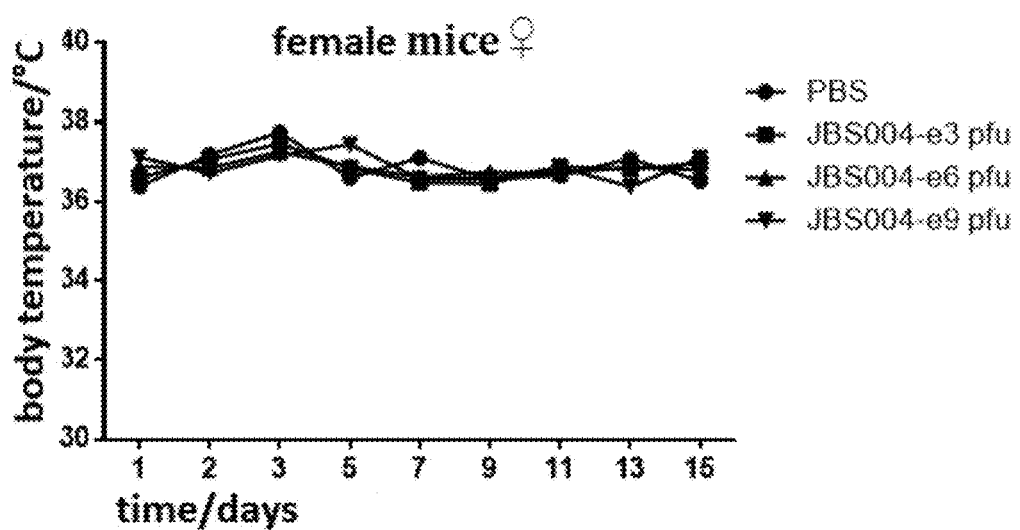
FIG. 21 is a schematic diagram showing an effect of JBS004 at different doses on the temperature of healthy female mice at different time points.
Figure 22:
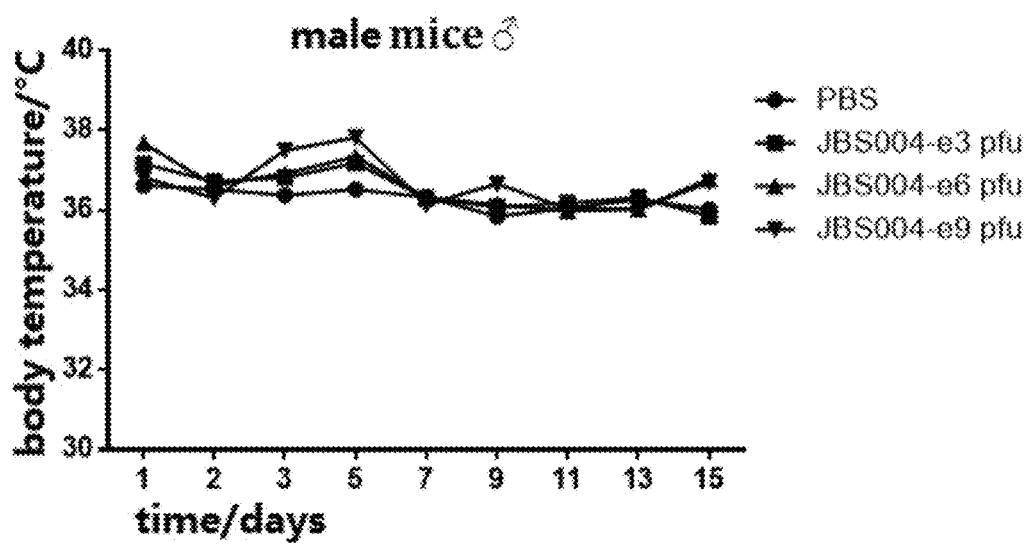
FIG. 22 is a schematic diagram showing an effect of JBS004 at different doses on the temperature of healthy male mice at different time points.
Figure 23:
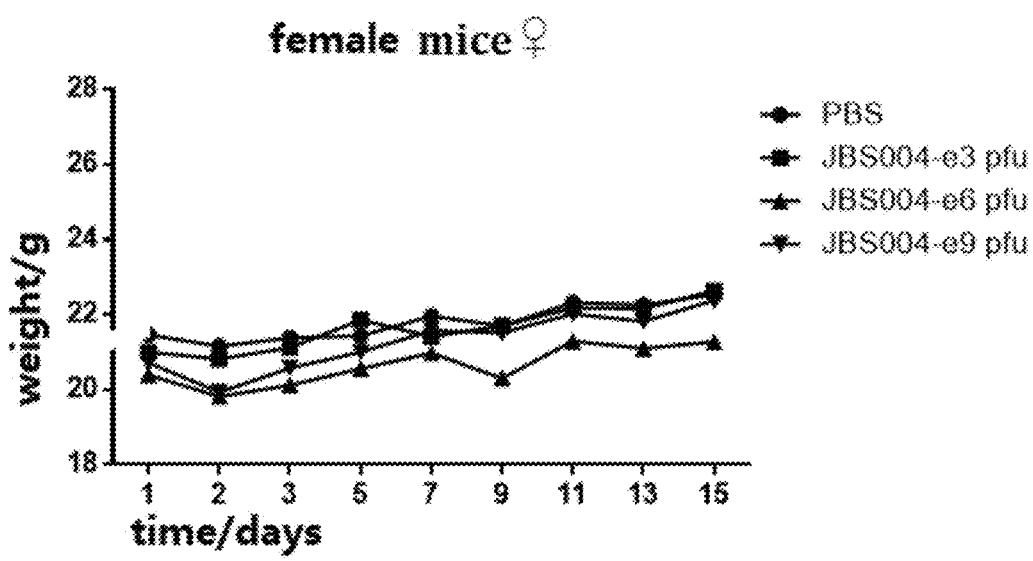
FIG. 23 is a schematic diagram of an effect of JBS004 at different doses on the body weight of healthy female mice at different time points.
Figure 24:
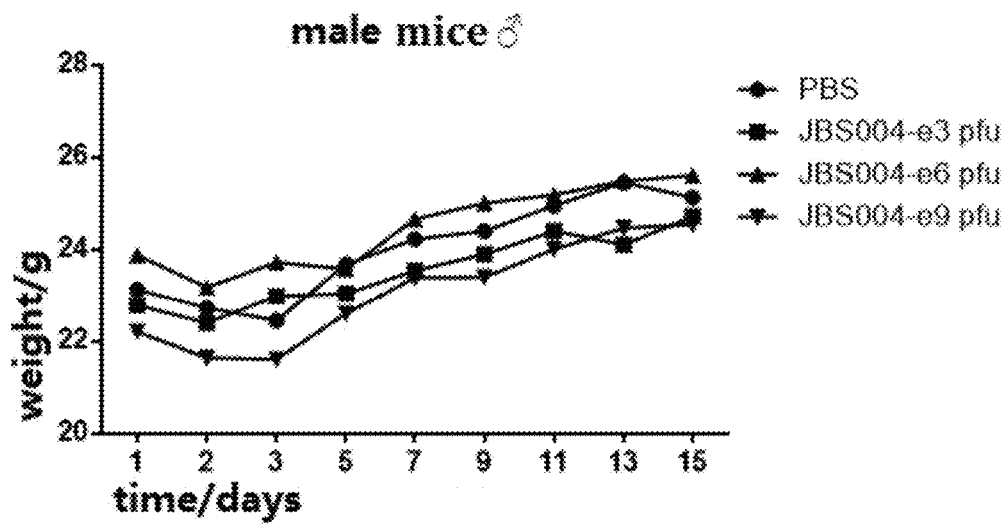
FIG. 24 is a schematic diagram showing an effect of JBS004 at different doses on the body weight of healthy male mice at different time points.

1. The pharmacokinetics test. C57BL/6 mice were selected, and $2\times10^5$ of LLC cells were subcutaneously inoculated. After about 9 days of the inoculation, when the volume of the transplanted tumor was about 100 mm³, a transplanted tumor model of LLC was established. JBS004 at $10^8$ pfu/mouse was intratumorally injected once, and the tumor tissues were sampled at 0 min (+15 min), 6 hours, 12 hours, 48 hours, 96 hours, 120 hours and 14 days respectively (repeated 3 copies), and the tumor tissues were broken with an automatic mill; total RNA of the tumor tissues were extracted by using Trizol, and finally a copy number of viral nucleic acids was analyzed with quantitative PCR (fluorescence probe method). Results were shown in FIG. 19 and FIG. 20.

The results indicated that an amount of the viruses in the tumors reached a peak at 6 hours of the infection, which was about 500 times more than the initial dose; at 48 hours of the infection, the amount of the viruses began to be lower than the initial dose; after 14 days, the copy number of viral nucleic acid was not detected.

Thus, JBS004 can be replicated in the tumors rapidly and efficiently; after 14 days, JBS004 was not detected, which proved that it will not accumulate in the body for a long time and will not cause potential subsequent damage, thus JBS004 had a good safety.

2. The acute toxicity test. 40 C57BL/6 mice with half male and half female were selected. The mice were divided into 3 administrated groups and a control group, and JBS004 solution was administered to the mice in the administration groups by single intramuscular injection, and the dose of each administration group respectively was: $10^3$ pfu/mouse, $10^6$ pfu/mouse and $10^9$ pfu/mouse. A menstruum was injected into the mice (single intramuscular injection of PBS) in the control group, and the volume of the administration was 100 μL. A day of the administration to the mice was defined as a first day of observing mice in this group. The mice were observed for 14 days after the administration to the animals and dissecting on 15th day after the administration.

During the experiment, the body temperature and the weight of the mice were recorded every 2 days. Results were shown in FIGS. 21-24. Before the administration and after the administration of 30 min, 1 h, 2 h, 4 h and 10 h, the mice were carefully observed at a side of a cage, and the mice were further carefully observed at the side of the cage at least once a day in subsequent experiments. At the end of the experiment, a peripheral blood of the mice was taken for hematology and blood biochemistry detection (blood glucose, creatinine, urea nitrogen, blood urea nitrogen/creatinine, phosphorus ion, calcium ion, total protein, albumin, globulin and etc.), and main organs, including heart, liver, spleen, lung, kidney, brain and testicle/ovary were collected during autopsy for weighing tissues, and calculating an organ coefficient.

Due to a length limitation, test results of indexes related to the hematology and the blood biochemistry were not listed all here. The test results indicated that there was no abnormal death of the mice and no clinical symptoms related to JBS004. Injection of JBS004 at different doses had no significant effect on a weight of an organ of the mice and the indexes related to the hematology and the blood biochemical of the mice. Under conditions of this experimental, a maximum tolerable dose (MTD) was at least $10^9$ pfu/mouse. Therefore, the above optimal dose ($10^8$ pfu/animal) was within the safe dose.

Example 4 Construction of JBS-NY TCR-T

JBS-NY TCR-T was a T cell obtained by transfecting a T lymphocyte with a recombinant lentivirus of NY-ESO-1 receptor. Specifically, a construction method was a conventional technology in the field, which was briefly described as follows.

(1) A gene of NY-ESO-1 receptor was artificially synthesized according to a published gene sequence of NY-ESO-1 receptor.

(2) Construction of a recombinant lentiviral vector. A gene segment of NY-ESO-1TCR was amplified by PCR, and primers were as follows:

```
ESO TCR-F1:
                                    (SEQ ID NO: 12)
5'-GGAATTCATGGAGACCCTCT-3';

ESO TCR-R1:
                                    (SEQ ID NO: 13)
5'-ATAGTTTAGCGGCCGCCTAGCCTCTGGAA-3'.
```

PCR was performed by using a cloned ESO TCR cDNA as a template for an amplification in vitro. Reaction conditions of the PCR were as follows: pre-denaturation at 94° C. for 3 min; denaturation at 94° C. for 30s, annealing at 55° C. for 30s, and extension at 72° C. for 45s, 35 cycles; and then extension at 72° C. for 5 min. A specific segment (1824 bp) amplified by the PCR was separated by 1.2% agarose gel electrophoresis. A PCR product and a pCL20c-MSCV-GFP plasmid were double digested with EcoR I and Not I respectively, and digested products were extracted by a glass milk gel. Two digested products were connected with T4 DNA ligase overnight at 16° C. Then, a connection product was transformed into a competent DH5a bacteria, and plasmids were extracted with B-type mini-plasmid kit after culture and amplification.

(3) Identification of a recombinant lentiviral vector of pCL20c-MSCV-ESO TCR. A pCL20c-MSCV-ESO TCR plasmid was double digested with EcoR I and Not I, and then sent to sequencing after PCR.

(4) Packaging of the recombinant lentiviral vector of pCL20c-MSCV-ESO TCR. T293 cells were routinely cultured in a DMEM medium containing 10% fetal bovine serum in an incubator with 95% humidity, 5% $CO_2$, and 37° C.; and passaged 3 to 4 times a week. One day before the transfection, $5\times10^6$-$6\times10^6$ T293 cells were inoculated into a cell culture dish with D=10 cm. 2 hours before the transfection, 10 mL of fresh 10% DMEM medium was replaced.

A transfection solution was prepared 1 hour before the transfection, and the transfection solution consisted of solution A and solution B. Solution A: 6 μg of pCL20c-HIV-gp plasmid, 2 μg of pCAG4-RTR2 plasmid, 2 μg of CAG-VSV-G plasmid, 10 μg of pCL20c-MSCV-ESOTCR plasmid, 50 μL of 2.5 mol/L $CaCl_2$) solution, make up to a volume of 500 μL with deionized water, flicked to mix and kept at room temperature for 5 minutes. Solution B: 500 μL of 2×HBSS (280 mmol/L NaCl, 50 mmol/L HEPES, 1.5 mmol/L $Na_2HPO_4$, pH=7.02). The solution A was dripped into the solution B, and a obtained mixture was shaken while adding the solution B; then kept at room temperature for 20 minutes to obtain the transfection solution. The petri dish was taken out from the incubator, tilted 15° toward the body, then the transfection solution was carefully dripped into a lower side of the petri dish, and a obtained mixture was shaken left and right while adding the transfection solution, and incubated in the incubator for 16 hours or overnight. Then 10 mL of fresh growth medium was replaced. A supernatant was collected after 48 hours of the transfection and stored at −80° C. 100 mL of packaging supernatant was taken out, thawed at room temperature, and centrifuged at 2000×g for 30 min, then collected a supernatant. The supernatant was filtered through a 0.45 μm PVDF membrane, ultracentrifuged at 12000×g for 3 h to obtain a virus precipitate. 1 mL of serum-free DMEM was added to resuspend the virus precipitate, packed at 100 μL/tube and stored at −80° C.

(5) Isolation of T cells from peripheral blood. T lymphocytes were isolated from the peripheral blood of a NCG-HLA-A2.1/Gpt humanized mouse. A cell separation medium was added into the peripheral blood, centrifuged at 1500 g/min for 15 min, then a second layer of ring-shaped milky lymphocytes was collected. 5 mL of cell washing solution was added into the lymphocytes, after fully mixing, centrifuged at 1800 g/min for 20 minutes, discarded a supernatant, and resuspended a precipitated lymphocytes.

(6) Recombinant lentiviruses were co-transfected with T cells. The resuspended lymphocytes was adjusted to $2\times10^5$ cells/mL, 6m/mL polybrene and an appropriate amount of $10^4$ pfu virus were added, repeated mixing, incubated at 37° C., and continued to culture for 3 to 4 days to obtain the JBS-NY TCR-T.

Example 5 an Effect of the Oncolytic Virus Vaccine Combined with the JBS-NY TCR-T NCG-HLA-A2.1/Gpt humanized mice aged 6-8 weeks and weighed 18-20 g were selected, subcutaneously inoculated with $2\times10^5$ non-small cell lung carcinoma A549 cells, and cultured under the same and appropriate conditions until the volume of the transplanted tumor was about 100 $mm^3$, then a treatment was started. Treatment conditions in each group were shown in Table 3. In Table 3, an inoculation amount of JBS NY TCR-T cells was $10^6$, which was performed by a single intravenous injection. If JBS-NY TCR-T cells and the oncolytic virus vaccine were used in combination, a corresponding oncolytic virus vaccine was injected intratumorally after 24 hours of the JBS-NY TCR-T cells were injected intravenously. The oncolytic virus vaccine was injected once every 2 days for a total of 3 times, and a single dose was $10^8$ pfu/mouse.

TABLE 3

| Treatment conditions in each group | | | | |
|---|---|---|---|---|
| Groups | Inoculating TCR-T or not | Kinds of TCR-T | Kinds of oncolytic virus inoculated | Other |
| Control group | No | / | / | Equivalent PBS |
| Group 1 | No | / | JBS004 | / |
| Group 2 | No | / | JBS005 | / |
| Group 3 | No | / | JBS006 | / |
| Group 4 | No | / | JBS007 | / |
| Group 5 | Yes | JBS-NY TCR-T | / | / |
| Group 6 | Yes | JBS-NY TCR-T | JBS004 | / |
| Group 7 | Yes | JBS-NY TCR-T | JBS005 | / |
| Group 8 | Yes | JBS-NY TCR-T | JBS006 | / |
| Group 9 | Yes | JBS-NY TCR-T | JBS007 | / |

Figure 25:
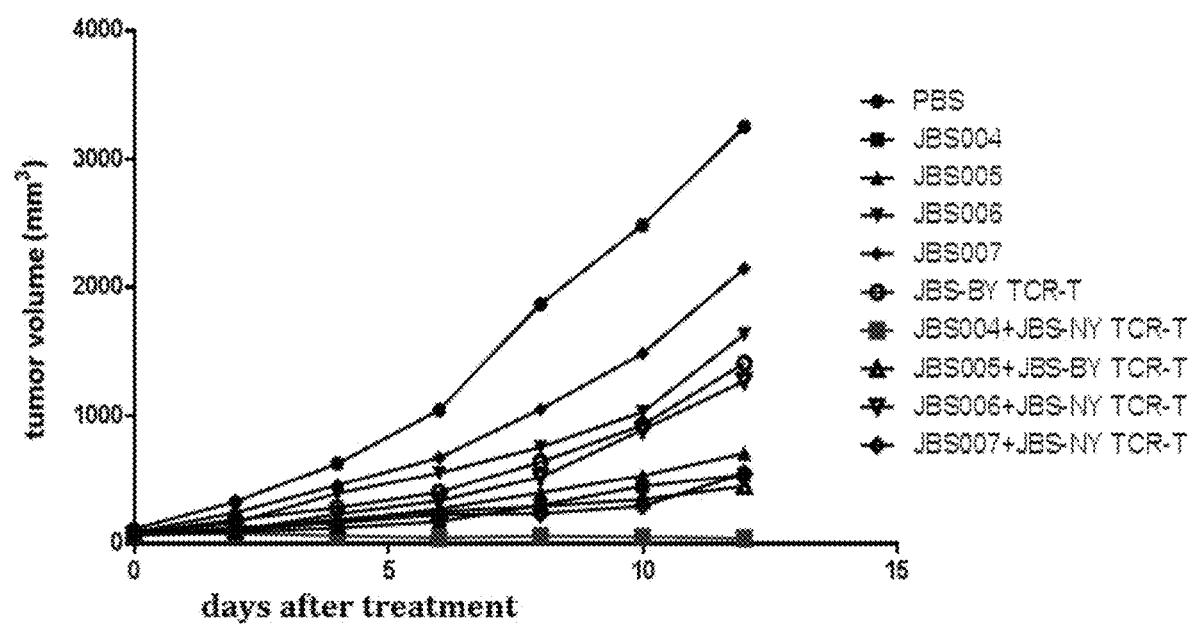
FIG. 25 is a schematic diagram of an effect on the volume of lung cancer (transplanted tumor) treated with individual vaccine separately or in combination with JBS-NY TCR-T.
Figure 26:
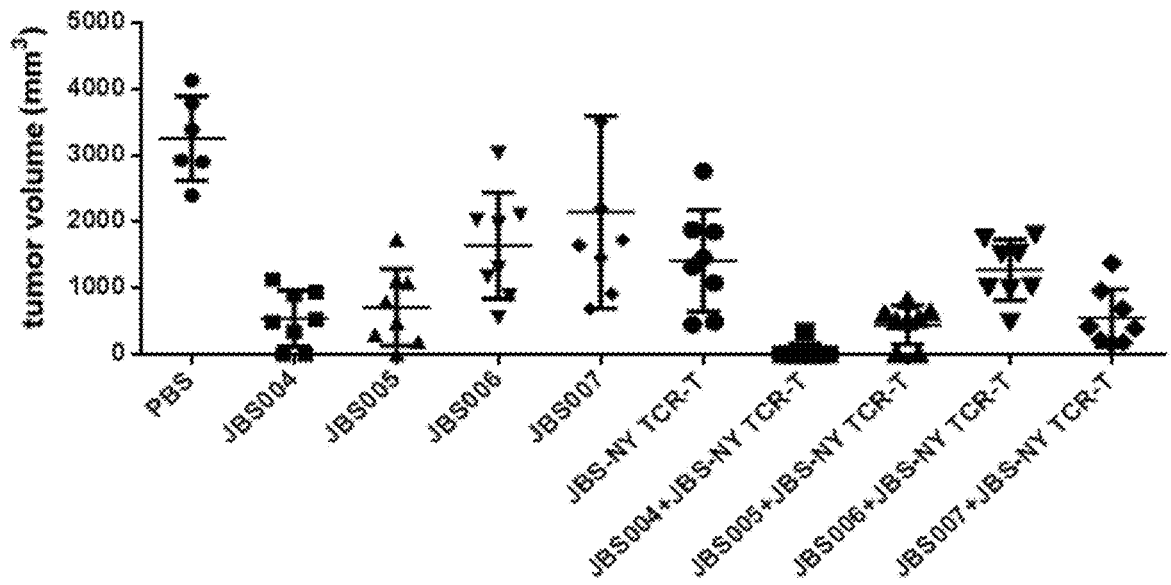
FIG. 26 is a schematic diagram of a volume of lung cancer (transplanted tumor) treated with individual vaccines separately or in combination with JBS-NY TCR-T at the end of the experiment.
Figure 27:
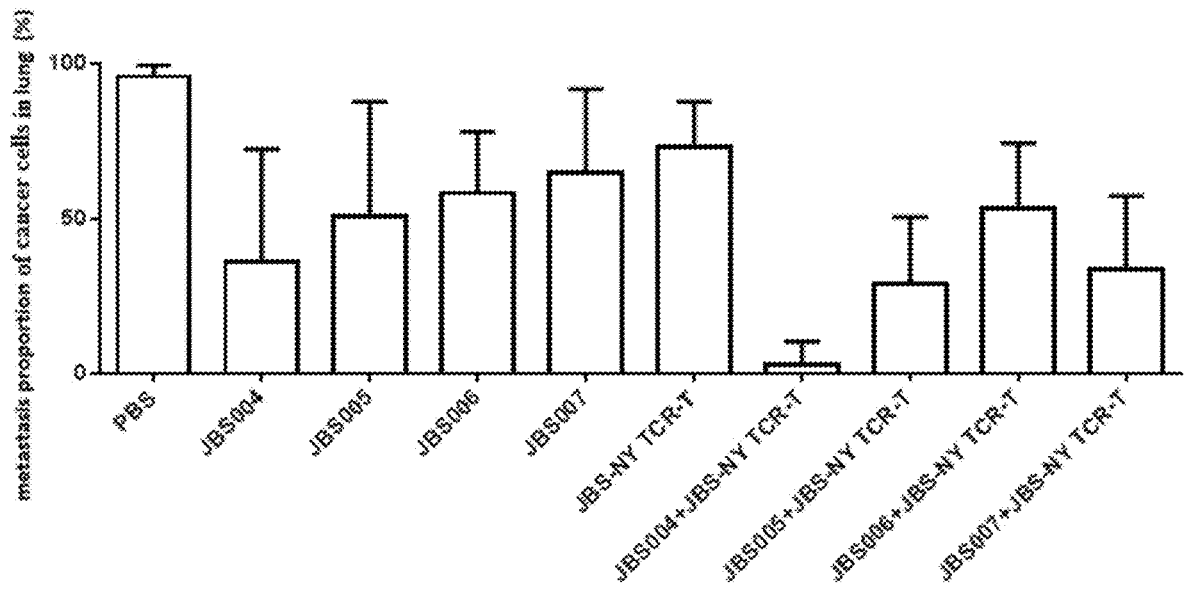
FIG. 27 is a schematic diagram showing an effect of individual vaccines separately or in combination with JBS-NY TCR-T on a metastasis of lung cancer cells.

From the beginning of the administration to the end of the experiment, the volume of the transplanted tumor was recorded every 2 days. Results were shown in FIG. 25 and FIG. 26. A metastasis of lung cancer cells in all groups was detected, and the results were shown in FIG. 27. The results showed that, except the control group, other groups had a certain inhibitory effect on the volume of the transplanted tumor. From the figures, it was surprising to find that the treatment effect of JBS004 combined with JBS-NY TCR-T was significantly improved, a cure rate was improved to 92-95% from 25% of original cure rate, showing advantages of the combined treatment. It also showed an excellent effect on inhibiting the metastasis of lung cancer cells.

The foregoing detailed description are provided by way of explanations and examples and are not intended to limit the scope of the attached claims. Various modifications to the embodiments presently enumerated in the present application are obvious to those of ordinary skill in the art and remain within the scope of the attached claims and its equivalents.

What is claimed is:

1. An attenuated oncolytic virus strain, wherein the attenuated oncolytic virus strain is a vesicular stomatitis virus (VSV) MuddSummer subtype strain with a modified matrix protein M, and wherein the modified matrix protein M comprises an amino acid sequence selected from the group consisting of SEQ ID NO: 4, SEQ ID NO: 7, SEQ ID NO: 8, SEQ ID NO: 9, SEQ ID NO: 10 and SEQ ID NO: 11.

2. An oncolytic virus vaccine, wherein the oncolytic virus vaccine is prepared by inserting an antigen into the attenuated oncolytic virus strain according to claim 1.

3. The oncolytic virus vaccine according to claim 2, wherein the antigen is a specific tumor antigen.

4. The oncolytic virus vaccine according to claim 2, wherein the antigen is one selected from a group consisting of: NY-ESO-1, gp33, gp100, TX103, Mucin-1, WT-1, MART-1, MAGE A1, MAGE A3, MAGE A4, MAGE B2, PRAME, SURVIVIN, MART-1, col6A3, tyrosinase, T antigen, SLC45A2, VCX/Y, HPV, alpha-fetoprotein, carcinoembryonic antigen, CA 125, Her2, Dopachrome Tautomerase, BAGE Protein, GAGE Protein, Survivin, Tyrosinase, SSX2, Cyclin-A1, KIF20A, MUC5AC, Meloe, Lengsin, Kallikrein 4, IGF2B3, and Phosphatidylinositol proteoglycan 3.

5. An antitumor drug or a drug for treating cancer prepared from the oncolytic virus vaccine according to claim 2.

6. The antitumor drug or the drug for treating cancer according to claim 5, wherein the antitumor drug or the drug for treating cancer comprises both the oncolytic virus vaccine and immune cells.

7. The antitumor drug or the drug for treating cancer according to claim 6, wherein the immune cells are one selected from a group consisting of a T cell, a NK cell, a macrophage, a DC cell, and a TIL cell; when the immune cells are the T cell, the T cell is one selected from a group consisting of a TCR-T cell, a CAR-T cell, a γ/δ-T cell, and a gene-edited T cell; when the immune cells are the TCR-T cell, the TCR-T cell is a TCR-T cell transfected by lentivirus or mRNA technology, a TCR-T cell isolated from blood, or a TCR-T cell obtained by any technology; when the immune cells are the NK cell, the NK cell is a NK cell or a CAR-NK cell; and when the immune cells are the macrophage, the macrophage is a macrophage or a CAR-M cell.

8. The antitumor drug or the drug for treating cancer according to claim 5, wherein a tumor or the cancer is one selected from a group consisting of: head and neck cancer, melanoma, soft tissue sarcoma, breast cancer, esophageal cancer, lung cancer, ovarian cancer, bladder cancer, liver cancer, cervical cancer, neuroblastoma, synovial sarcoma, and round cell liposarcoma.

* * * * *

SEQUENCE LISTING

```
Sequence total quantity: 13
SEQ ID NO: 1              moltype = DNA   length = 690
FEATURE                   Location/Qualifiers
source                    1..690
                          mol_type = genomic DNA
                          note = Indiana strain of vesicular stomatitis virus(VSV
                            MuddSummer)
                          organism = unidentified
SEQUENCE: 1
atgagttcct taaagaagat tctcggtctg aaggggaaag gtaagaaatc taagaaatta   60
gggatcgcac caccccctta tgaagaggac actagcatgg agtatgctcc gagcgctcca  120
attgacaaat cctattttgg agttgacgag atggacacct atgatccgaa tcaattaaga  180
tatgagaaat tcttctttac agtgaaaatg acggttagat ctaatcgtcc gttcagaaca  240
tactcagatg tggcagccgc tgtatcccat gggatcaca tgtacatcgg aatggcaggg   300
aaacgtccct tctacaaaat cttggctttt ttgggttctt ctaatctaaa ggccactcca  360
gcggtattgg cagatcaagg tcaaccagag tatcacgctc actgcgaagg caggcttat   420
ttgccacata ggatggggaa gaccctccc atgctcaatg taccagagca cttcagaaga   480
ccattcaata taggtcttta caagggaacg attgagctca caatgaccat ctacgatgat  540
gagtcactgg aagcagctcc tatgatctgg gatcatttca attcttccaa attttctgat  600
ttcagagaga aggccttaat gtttggcctg attgtcgaga aaaaggcatc tggagcgtgg  660
gtcctggact ctatcagcca cttcaaatga                                   690

SEQ ID NO: 2              moltype = AA    length = 229
FEATURE                   Location/Qualifiers
source                    1..229
                          mol_type = protein
                          note = Indiana strain of vesicular stomatitis virus(VSV
                            MuddSummer)
                          organism = unidentified
SEQUENCE: 2
MSSLKKILGL KGKGKKSKKL GIAPPPYEED TSMEYAPSAP IDKSYFGVDE MDTYDPNQLR    60
YEKFFFTVKM TVRSNRPFRT YSDVAAAVSH WDHMYIGMAG KRPFYKILAF LGSSNLKATP  120
AVLADQGQPE YHAHCEGRAY LPHRMGKTPP MLNVPEHFRR PFNIGLYKGT IELTMTIYDD  180
ESLEAAPMIW DHFNSSKFSD FREKALMFGL IVEKKASGAW VLDSISHFK              229

SEQ ID NO: 3              moltype = DNA   length = 687
FEATURE                   Location/Qualifiers
misc_feature              1..687
                          note = Matrix Protein MM51RL111V221FS226R
source                    1..687
                          mol_type = other DNA
                          organism = synthetic construct
SEQUENCE: 3
atgagttcct taaagaagat tctcggtctg aaggggaaag gtaagaaatc taagaaatta   60
gggatcgcac caccccctta tgaagaggac actagcatgg agtatgctcc gagcgctcca  120
attgacaaat cctattttgg agttgacgag agggacacct atgatccgaa tcaattaaga  180
tatgagaaat tcttctttac agtgaaaatg acggttagat ctaatcgtcc gttcagaaca  240
tactcagatg tggcagccgc tgtatcccat gggatcaca tgtacatcgg aatggcaggg   300
aaacgtccct tctacaaaat cttggctttt ggttcttcta atctaaaggc cactccagcg  360
gtattggcag atcaaggtca accagagtat cacgctcact gcgaaggcag gcttatttgc  420
cacatagga tggggaagac ccctcccatg ctcaatgtac agagcactt cagaagacca    480
ttcaatatag tctttacaa gggaacgatt gagctcacaa tgaccatcta cgatgatgag  540
tcactggaag cagctcctat gatctgggat catttcaatt cttccaaatt ttctgatttc  600
agagagaagg ccttaatgtt tggcctgatt gtcgagaaaa aggcatctgg agcgtggttc  660
ctggactcta tccggcactt caaatga                                     687

SEQ ID NO: 4              moltype = AA    length = 228
FEATURE                   Location/Qualifiers
REGION                    1..228
                          note = Matrix Protein MM51RL111V221FS226RPRT
source                    1..228
                          mol_type = protein
                          organism = synthetic construct
SEQUENCE: 4
MSSLKKILGL KGKGKKSKKL GIAPPPYEED TSMEYAPSAP IDKSYFGVDE RDTYDPNQLR    60
YEKFFFTVKM TVRSNRPFRT YSDVAAAVSH WDHMYIGMAG KRPFYKILAF GSSNLKATPA  120
VLADQGQPEY HAHCEGRAYL PHRMGKTPPM LNVPEHFRRP FNIGLYKGTI ELTMTIYDDE  180
SLEAAPMIWD HFNSSKFSDF REKALMFGLI VEKKASGAWF LDSIRHFK               228

SEQ ID NO: 5              moltype = DNA   length = 20
FEATURE                   Location/Qualifiers
```

```
misc_feature            1..20
                        note = Primer 1
source                  1..20
                        mol_type = other DNA
                        organism = synthetic construct
SEQUENCE: 5
aaaaaagtaa cagatatcac                                                       20

SEQ ID NO: 6            moltype = DNA  length = 24
FEATURE                 Location/Qualifiers
misc_feature            1..24
                        note = Primer 2
source                  1..24
                        mol_type = other DNA
                        organism = synthetic construct
SEQUENCE: 6
acatttttcc agtttccttt ttgg                                                  24

SEQ ID NO: 7            moltype = AA  length = 228
FEATURE                 Location/Qualifiers
REGION                  1..228
                        note = Matrix Protein ML111
source                  1..228
                        mol_type = protein
                        organism = synthetic construct
SEQUENCE: 7
MSSLKKILGL KGKGKKSKKL GIAPPPYEED TSMEYAPSAP IDKSYFGVDE MDTYDPNQLR            60
YEKFFFTVKM TVRSNRPFRT YSDVAAAVSH WDHMYIGMAG KRPFYKILAF GSSNLKATPA           120
VLADQGQPEY HAHCEGRAYL PHRMGKTPPM LNVPEHFRRP FNIGLYKGTI ELTMTIYDDE           180
SLEAAPMIWD HFNSSKFSDF REKALMFGLI VEKKASGAWV LDSISHFK                        228

SEQ ID NO: 8            moltype = AA  length = 228
FEATURE                 Location/Qualifiers
REGION                  1..228
                        note = Matrix Protein ML111M51R
source                  1..228
                        mol_type = protein
                        organism = synthetic construct
SEQUENCE: 8
MSSLKKILGL KGKGKKSKKL GIAPPPYEED TSMEYAPSAP IDKSYFGVDE RDTYDPNQLR            60
YEKFFFTVKM TVRSNRPFRT YSDVAAAVSH WDHMYIGMAG KRPFYKILAF GSSNLKATPA           120
VLADQGQPEY HAHCEGRAYL PHRMGKTPPM LNVPEHFRRP FNIGLYKGTI ELTMTIYDDE           180
SLEAAPMIWD HFNSSKFSDF REKALMFGLI VEKKASGAWV LDSISHFK                        228

SEQ ID NO: 9            moltype = AA  length = 228
FEATURE                 Location/Qualifiers
REGION                  1..228
                        note = Matrix Protein ML111V221F
source                  1..228
                        mol_type = protein
                        organism = synthetic construct
SEQUENCE: 9
MSSLKKILGL KGKGKKSKKL GIAPPPYEED TSMEYAPSAP IDKSYFGVDE MDTYDPNQLR            60
YEKFFFTVKM TVRSNRPFRT YSDVAAAVSH WDHMYIGMAG KRPFYKILAF GSSNLKATPA           120
VLADQGQPEY HAHCEGRAYL PHRMGKTPPM LNVPEHFRRP FNIGLYKGTI ELTMTIYDDE           180
SLEAAPMIWD HFNSSKFSDF REKALMFGLI VEKKASGAWF LDSISHFK                        228

SEQ ID NO: 10           moltype = AA  length = 228
FEATURE                 Location/Qualifiers
REGION                  1..228
                        note = Matrix Protein ML111S226R
source                  1..228
                        mol_type = protein
                        organism = synthetic construct
SEQUENCE: 10
MSSLKKILGL KGKGKKSKKL GIAPPPYEED TSMEYAPSAP IDKSYFGVDE MDTYDPNQLR            60
YEKFFFTVKM TVRSNRPFRT YSDVAAAVSH WDHMYIGMAG KRPFYKILAF GSSNLKATPA           120
VLADQGQPEY HAHCEGRAYL PHRMGKTPPM LNVPEHFRRP FNIGLYKGTI ELTMTIYDDE           180
SLEAAPMIWD HFNSSKFSDF REKALMFGLI VEKKASGAWV LDSIRHFK                        228

SEQ ID NO: 11           moltype = AA  length = 228
FEATURE                 Location/Qualifiers
REGION                  1..228
                        note = Matrix Protein ML111V221FS226R
source                  1..228
                        mol_type = protein
                        organism = synthetic construct
SEQUENCE: 11
MSSLKKILGL KGKGKKSKKL GIAPPPYEED TSMEYAPSAP IDKSYFGVDE MDTYDPNQLR            60
```

-continued

```
YEKFFFTVKM TVRSNRPFRT YSDVAAAVSH WDHMYIGMAG KRPFYKILAF GSSNLKATPA  120
VLADQGQPEY HAHCEGRAYL PHRMGKTPPM LNVPEHFRRP FNIGLYKGTI ELTMTIYDDE  180
SLEAAPMIWD HFNSSKFSDF REKALMFGLI VEKKASGAWF LDSIRHFK              228

SEQ ID NO: 12          moltype = DNA  length = 20
FEATURE                Location/Qualifiers
misc_feature           1..20
                       note = Primer 3
source                 1..20
                       mol_type = other DNA
                       organism = synthetic construct
SEQUENCE: 12
ggaattcatg gagaccctct                                              20

SEQ ID NO: 13          moltype = DNA  length = 29
FEATURE                Location/Qualifiers
misc_feature           1..29
                       note = Primer 4
source                 1..29
                       mol_type = other DNA
                       organism = synthetic construct
SEQUENCE: 13
atagtttagc ggccgcctag cctctggaa                                    29
```